United States Patent
Shih et al.

(10) Patent No.: US 11,706,701 B2
(45) Date of Patent: *Jul. 18, 2023

(54) METHOD AND APPARATUS FOR PLMN SELECTION AND CELL (RE)SELECTION

(71) Applicant: FG Innovation Company Limited, Tuen Mun (HK)

(72) Inventors: Mei-Ju Shih, Taipei (TW); Yung-Lan Tseng, Taipei (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,648

(22) Filed: Sep. 7, 2021

(65) Prior Publication Data
US 2021/0400570 A1 Dec. 23, 2021

Related U.S. Application Data

(63) Continuation of application No. 16/728,961, filed on Dec. 27, 2019, now Pat. No. 11,166,227.
(Continued)

(51) Int. Cl.
*H04W 48/16* (2009.01)
*H04W 76/11* (2018.01)
(Continued)

(52) U.S. Cl.
CPC .......... *H04W 48/16* (2013.01); *H04W 16/14* (2013.01); *H04W 48/02* (2013.01);
(Continued)

(58) Field of Classification Search
CPC . H04W 48/20; H04W 36/0038; H04W 36/08; H04W 36/00835
See application file for complete search history.

(56) References Cited

U.S. PATENT DOCUMENTS

| | | | |
|---|---|---|---|
| 2009/0238114 A1* | 9/2009 | Deshpande | H04J 11/0069 370/328 |
| 2011/0294508 A1* | 12/2011 | Min | H04W 36/32 455/436 |

(Continued)

FOREIGN PATENT DOCUMENTS

| | | |
|---|---|---|
| CN | 105792176 A | 7/2016 |
| JP | H08-508630 A | 9/1996 |

(Continued)

OTHER PUBLICATIONS

Mediatek Inc. Cell selection and Reselection in NR-U 3GPP TSG-RAN2#104 meeting Tdoc R2-1816481 16, Spokane, USA, Nov. 16, 2018, pp. 1-3.
(Continued)

*Primary Examiner* — Joshua L Schwartz
(74) *Attorney, Agent, or Firm* — ScienBiziP, P.C.

(57) ABSTRACT

A method and an apparatus for wireless communications are provided. The method is performed by a UE and includes: reading system information of a plurality of cells on a first carrier frequency to obtain identification information of a plurality of PLMNs; reporting, by an AS entity of the UE, the identification information of the plurality of PLMNs to a NAS entity of the UE; selecting, by the NAS of the UE, one of the plurality of PLMNs as a selected PLMN; searching for the plurality of cells on the first carrier frequency during a cell selection procedure; and selecting a suitable cell belonging to the selected PLMN from the plurality of cells on the first carrier frequency based on the cell selection procedure.

20 Claims, 9 Drawing Sheets

Related U.S. Application Data

(60) Provisional application No. 62/788,223, filed on Jan. 4, 2019.

(51) Int. Cl.

| | | |
|---|---|---|
| *H04W 72/0453* | (2023.01) | |
| *H04W 76/25* | (2018.01) | |
| *H04W 48/02* | (2009.01) | |
| *H04W 76/27* | (2018.01) | |
| *H04W 16/14* | (2009.01) | |
| *H04W 84/04* | (2009.01) | |

(52) U.S. Cl.
CPC ........ *H04W 72/0453* (2013.01); *H04W 76/11* (2018.02); *H04W 76/25* (2018.02); *H04W 76/27* (2018.02); *H04W 84/042* (2013.01)

(56) References Cited

U.S. PATENT DOCUMENTS

| | | |
|---|---|---|
| 2016/0029276 A1 | 1/2016 | Ye |
| 2017/0289904 A1 | 10/2017 | Li |
| 2018/0270895 A1 | 9/2018 | Park et al. |
| 2019/0306764 A1* | 10/2019 | da Silva ................ H04W 36/04 |

FOREIGN PATENT DOCUMENTS

| | | |
|---|---|---|
| JP | 2016521086 A | 7/2016 |
| JP | 2018504867 A | 2/2018 |
| JP | 2020507983 A | 3/2020 |
| WO | 2018142303 A1 | 8/2018 |
| WO | 2020067758 A1 | 4/2020 |

OTHER PUBLICATIONS

ZTE. The impact of multiple operators on cell selection for NR-U; 3GPP TSG-RAN WG2 meeting #103bis R2-1813739 12, Chengdu, China, Oct. 12, 2018, pp. 1-2.

Mediatek Inc. "Cell selection and Reselection in NR-U"; 3GPP Draft, R2-1816480, Spokane, USA, Nov. 16, 2018, pp. 1-4.

LG Electronics Inc, "Cell reselection on unlicensed frequency", R2-1812799, 3GPP TSG-RAN WG2 #103 Meeting Gothenburg, Sweden, Aug. 20-24, 2018, p. 1-p. 2.

Samsung, "Introducing issues for NR-U Idle mode operation", R2-1817933, 3GPP TSG-RAN WG2#104 Spokane, Washington, USA, Nov. 12-16, 2018, p. 1-p. 2.

LG Electronics Inc, "Reading MIB/SIB1 from non-best cells", R2-1818329, 3GPP TSG-RAN WG2 Meeting #104 Spokane, USA, Nov. 12-16, 2018, p. 1-p. 2, figure 1.

Samsung, "Introducing issues for NR-U Idle mode operation", R2-1815283, 3GPP TSG-RAN WG2 Meeting #103bis Chengdu, China, Oct. 8-12, 2018.

3GPP TS 38.304, "3rd Generation Partnership Project; Technical Specification Group Radio Access Network; NR User Equipment (UE) procedures in Idle mode and RRC Inactive state (Release 15)", V15.1.0 (Sep. 2018), p. 12, 15 and 20.

Ericsson, "Cell (re)selection for NR-U", R2-1913968, 3GPP TSG-RAN WG2 #107bis Chongqing, China, Oct. 14-18, 2019.

* cited by examiner

METHOD AND APPARATUS FOR PLMN SELECTION AND CELL (RE)SELECTION

CROSS-REFERENCE TO RELATED APPLICATION(S)

This application is a continuation application of U.S. patent application Ser. No. 16/728,961 filed on Dec. 27, 2019, which claims the benefit of and priority to a provisional U.S. Patent Application Ser. No. 62/788,223, filed on Jan. 4, 2019, the contents of all which are hereby fully incorporated herein by reference for all purposes.

FIELD

The present disclosure generally relates to wireless communications, and more particularly, to methods and apparatuses for Public Land Mobile Network (PLMN) selection and cell (re)selection.

BACKGROUND

Various efforts have been made to improve different aspects of wireless communications (e.g., data rate, latency, reliability, and mobility) for the next-generation (e.g., fifth generation (5G) New Radio (NR)) wireless communication systems. For example, to achieve higher capacity and promote higher spectrum utilization, the next-generation wireless communication systems may be enabled to operate on unlicensed spectrums. However, the current Radio Resource Control (RRC)_IDLE or RRC_INACTIVE state to RRC_CONNECTED state transition procedures, such as PLMN selection and cell (re)selection procedures, may not be adequate for UEs attempting to utilize the unlicensed spectrums to access the network in the next-generation wireless communication systems.

Therefore, there is a need in the art for providing methods and apparatuses for performing PLMN selection and cell (re)selection on the unlicensed spectrum(s).

SUMMARY

The present disclosure is directed to methods and apparatuses for PLMN selection and cell (re)selection.

According to an aspect of the present disclosure, a User Equipment (UE) for wireless communications is provided. The UE includes one or more non-transitory computer-readable media having computer-executable instructions embodied thereon and at least one processor coupled to the one or more non-transitory computer-readable media. The at least one processor is configured to execute the computer-executable instructions to read system information of a plurality of cells on a first carrier frequency to obtain identification information of a plurality of Public Land Mobile Networks (PLMNs); report, by an Access Stratum (AS) entity of the UE, the identification information of the plurality of PLMNs to a Non-Access Stratum (NAS) entity of the UE; select, by the NAS of the UE, one of the plurality of PLMNs as a selected PLMN; search for the plurality of cells on the first carrier frequency during a cell selection procedure; and select a suitable cell belonging to the selected PLMN from the plurality of cells on the first carrier frequency based on the cell selection procedure.

According to another aspect of the present disclosure, a method performed by a UE for wireless communications is provided. The method includes reading system information of a plurality of cells on a first carrier frequency to obtain identification information of a plurality of PLMNs; reporting, by an AS entity of the UE, the identification information of the plurality of PLMNs to a NAS entity of the UE; selecting, by the NAS of the UE, one of the plurality of PLMNs as a selected PLMN; searching for the plurality of cells on the first carrier frequency during a cell selection procedure; and selecting a suitable cell belonging to the selected PLMN from the plurality of cells on the first carrier frequency based on the cell selection procedure.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
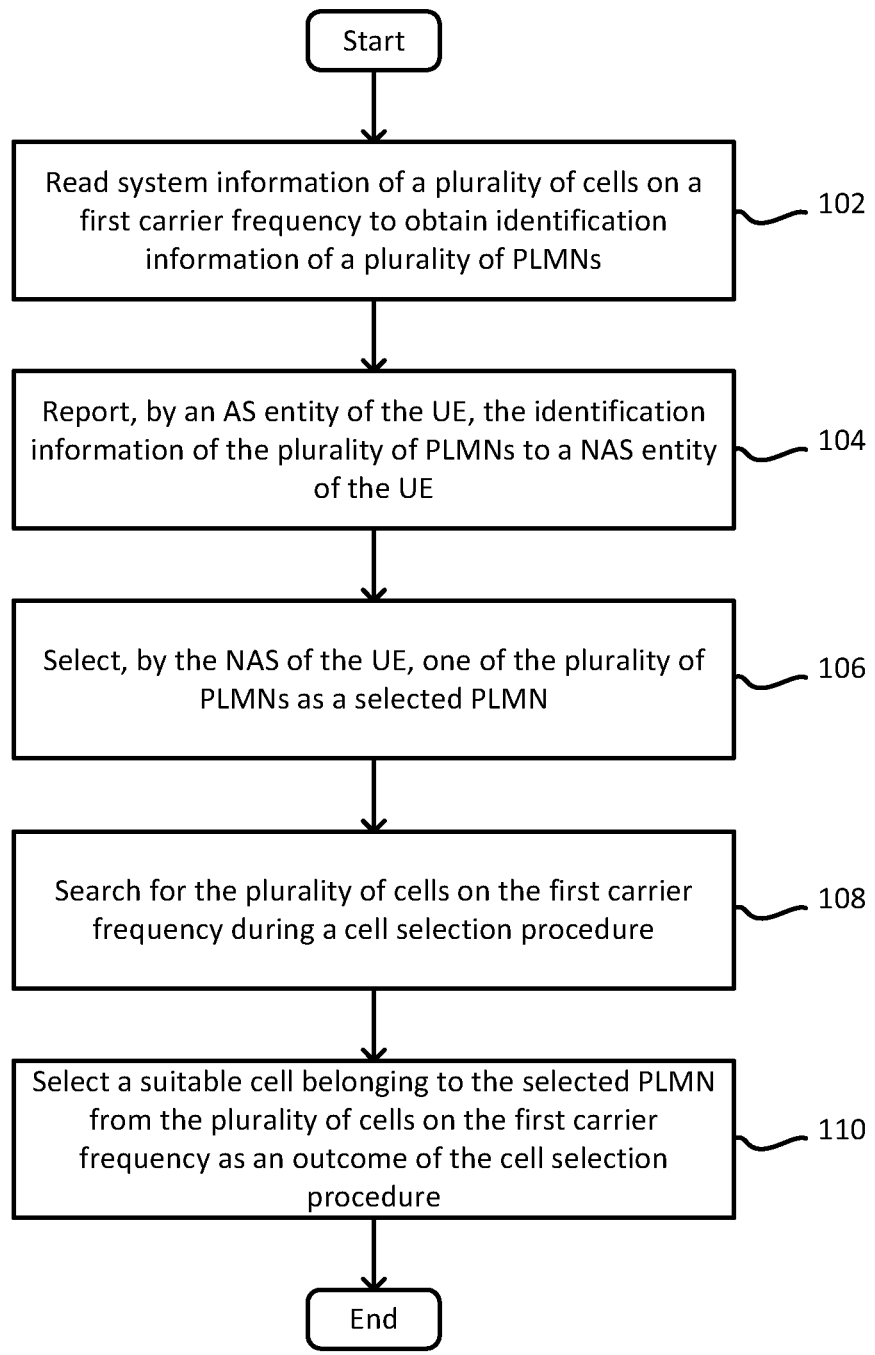
FIG. 1 illustrates a flowchart for a method of performing PLMN selection and cell (re)selection procedures on an unlicensed spectrum, in accordance with an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be different in other respects, and thus shall not be narrowly confined to what is shown in the figures.

The description uses the phrases "in one implementation," or "in some of the present implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer-executable instructions stored on computer-readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer-readable medium includes but is not limited to Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one Base Station (BS), at least one UE, and one or more optional network elements that provide connection towards a network. The UE communicates with the network (e.g., a Core Network (CN), an Evolved Packet Core (EPC) network, an Evolved Universal Terrestrial Radio Access Network (E-UTRAN), a 5G Core (5GC), or an internet), through a RAN established by one or more BSs.

It should be noted that, in the present application, a UE may include, but is not limited to, a mobile station, a mobile terminal or device, or a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A BS may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic Wideband-Code Division Multiple Access (W-CDMA), High-Speed Packet Access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A BS may include, but is not limited to, a node B (NB) as in the UMTS, an evolved Node B (eNB) as in the LTE or LTE-A, a Radio Network Controller (RNC) as in the UMTS, a Base Station Controller (BSC) as in the GSM/GERAN, a ng-eNB as in an Evolved Universal Terrestrial Radio Access (E-UTRA) BS in connection with the 5GC, a next generation Node B (gNB) as in the 5G-RAN, and any other apparatus capable of controlling radio communication and managing radio resources within a cell. The BS may serve one or more UEs through a radio interface.

The BS is operable to provide radio coverage to a specific geographical area using a plurality of cells forming the radio access network. The BS supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The BS can communicate with one or more UEs in the radio communication system through the plurality of cells. A cell may allocate Sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next-generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the $3^{rd}$ Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity- Check (LDPC) code and (2) Polar Code. The coding scheme adaption may be configured based on the channel conditions and/or the service applications.

Moreover, it is also considered that in a transmission time interval TX of a single NR frame, a Downlink (DL) transmission data, a guard period, and an Uplink (UL) transmission data should at least be included, where the respective portions of the DL transmission data, the guard period, the UL transmission data should also be configurable, for example, based on the network dynamics of NR. In addition, SL resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

On a licensed spectrum, a UE may perform a PLMN selection procedure based on the signal strength of cells (e.g., the measured Reference Signal Received Power (RSRP) from cells). The cells on the licensed spectrum may broadcast the identification information (e.g., PLMN Identities (IDs)) of the PLMNs and the UE's preconfigured PLMNs. On each licensed carrier frequency, the AS entity of the UE may report the PLMN IDs broadcast by the cell with the strongest signal strength, to the NAS entity of the UE. Generally, cells operating on a common licensed carrier frequency may belong to the same PLMN.

There may be multiple PLMNs operating on one carrier frequency. For example, one or more unlicensed RAT technologies (e.g., standalone New Radio-Unlicensed (NR-U)) may be introduced, meaning that multiple PLMNs may operate their own cells on the same unlicensed spectrum. Thus, the PLMN selection and cell (re)selection procedures on the unlicensed spectrum need to be provided, especially considering the uncertainty of channel load and channel sharing among multiple PLMNs. In another example, one or more PLMNs may operate on the same carrier frequency if RAN sharing scenarios are considered. PLMN(s) may be public PLMN(s) and/or private PLMN(s). Thus, the PLMN selection and cell (re)selection procedures when multiple PLMNs are operating on one carrier frequency need to be provided. In the RAN sharing scenarios, a RAN (or a cell) may be shared and operated by multiple PLMNs.

In some of the implementations, the UE may camp on a non-best cell on a carrier frequency (e.g., an unlicensed carrier frequency) if the best cell does not belong to a selected PLMN or a registered PLMN (or equivalent PLMN). The best cell may be the highest-ranked cell among cells on the same carrier frequency. The cells on the carrier frequency may be ranked by a received radio signal quality and/or other measured metric value(s). For example, the best cell (or highest-ranked cell) may be the cell having the best received radio signal quality on the carrier frequency, while the non-best cell (or the non-highest-ranked cell or lower-ranked cell) may be the cell other than the best cell on the carrier frequency.

It should be noted that the terms such as "best cell," "strongest cell," and "highest-ranked cell" may be interchangeable in some of the present implementations. Similarly, the terms such as "non-best cell," "non-strongest cell," "lower-ranked cell" and "non-highest-ranked cell" may be interchangeable in some of the present implementations.

In some of the implementations, all cells on a licensed carrier frequency may belong to the same (equivalent) PLMN. Thus, after the PLMN selection, the licensed carrier frequency may be indirectly selected. The UE may then prioritize the cells, and camp on the strongest cell on the licensed carrier frequency. Unlike the licensed spectrum operations, one or more of the cells sharing the same unlicensed carrier frequency may belong to different PLMNs. If the UE prioritizes the cells and camps on the strongest cell on the unlicensed carrier frequency after the PLMN selection, the UE may waste time and consume extra power on searching for the suitable cell, when the strongest cell does not belong to a selected/registered/equivalent PLMN. In view of this, PLMN selection and cell (re)selection methods for unlicensed spectrum operations are provided in at least some of the present implementations.

It should be noted that the PLMN selection and the cell (re)selection methods described herein may be also applied to the licensed spectrum operations.

FIG. 1 illustrates a flowchart for a method of performing PLMN selection and cell (re)selection procedures on an unlicensed spectrum, in accordance with an example implementation of the present disclosure. As shown in FIG. 1, the method includes actions 102, 104, 106, 108 and 110, where actions 102, 104 and 106 may be performed during a PLMN selection procedure, and actions 108 and 110 may be performed during a cell selection procedure.

In action 102, a UE may read system information of a plurality of cells on a first carrier frequency to obtain identification information of a plurality of PLMNs. In some of the present implementations, the first carrier frequency may be an unlicensed carrier frequency. The plurality of cells may include the strongest cell and non-strongest cells. Each cell may broadcast the identification information of a plurality of PLMNs in the system information (e.g., System Information Block 1 (SIB1)).

In action 104, the AS entity of the UE may report the identification information of the plurality of PLMNs to the NAS entity of the UE. The PLMNs identified by the identification information of the plurality of PLMNs reported by the AS entity of the UE to the NAS entity of the UE may refer to the found PLMNs of the UE. The NAS entity of the UE may be used to provide the upper layer signaling (e.g., NAS signaling) between the UE and the core network, and the AS entity of the UE may be used to provide the lower layer signaling (e.g., RRC signaling) between the RAN and the UE. For example, the AS entity may be used for transporting data over the wireless connection and managing the radio resources. The AS entity may include, for example, one or more layers of a protocol stack including a physical (PHY) layer, a Medium Access Control (MAC) layer, a Radio Link Control (RLC) layer, a Packet Data Convergence Protocol (PDCP) layer, a Service Data Adaptation Protocol (SDAP) layer and an RRC layer. Each of the AS entity and the NAS entity of the UE may be implemented using electronic hardware, computer software, or any combination thereof.

In action 106, the NAS entity of the UE may select one of the plurality of PLMNs as a selected PLMN. For example, the NAS entity of the UE may maintain or store a list of registered/equivalent/subscribed PLMNs and select the PLMN which is mapped to the list as the outcome (e.g., the selected PLMN) of the PLMN selection procedure.

In action 108, the UE may search for the plurality of cells on the first carrier frequency during a cell selection procedure. The UE may not only search for the strongest cell but also search for additional cells on the first carrier frequency during the cell selection procedure. In some implementations, the additional cells may or may not have a signal strength (e.g., RSRP, Reference Signal Received Quality (RSRQ)) above a threshold (e.g., the additional cells may fulfill the S criterion). The plurality of cells may be searched based on certain (pre)configured or predefined rules. For example, the plurality of cells may be the N-strongest (e.g., top N) cells on the first carrier frequency, where N is a positive integer. In some of the present implementations, the value of N may be predefined (e.g., defined by 3GPP specifications), preconfigured to the UE (e.g., stored in a Universal Subscriber Identity Module (USIM) and/or stored in a Universal Integrated Circuit Card (UICC)), configured by cell(s) (e.g., via system information and/or via dedicated signaling), or determined based on UE implementation.

In action 110, the UE may select a suitable cell belonging to the selected PLMN from the plurality of cells on the first carrier frequency as an outcome of the cell selection procedure. The suitable cell may or may not be the strongest cell on the first carrier frequency.

Figure 2A:
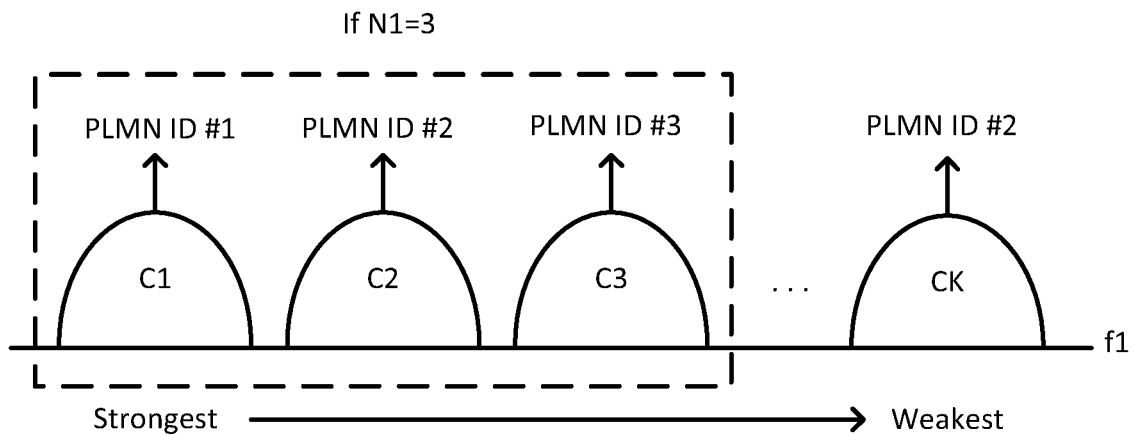
FIG. 2A is a schematic diagram illustrating a PLMN selection procedure, in accordance with an example implementation of the present disclosure.
Figure 2B:
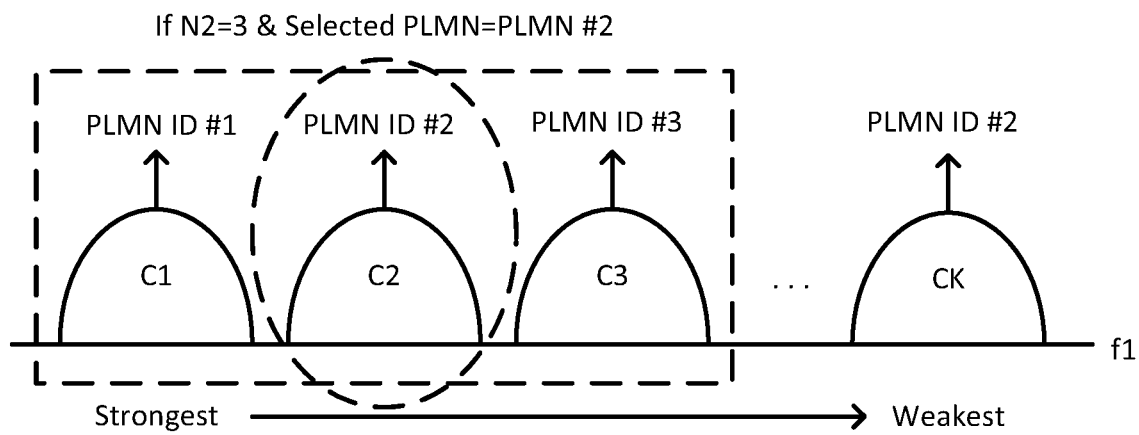
FIG. 2B is a schematic diagram illustrating a cell selection procedure, in accordance with an example implementation of the present disclosure.

FIG. 2A is a schematic diagram illustrating a PLMN selection procedure, in accordance with an example implementation of the present disclosure. FIG. 2B is a schematic diagram illustrating a cell selection procedure, in accordance with an example implementation of the present disclosure.

In FIG. 2A, there are K cells C1, C2, C3, . . . , and CK on carrier frequency f1. In the example implementation as illustrated in FIGS. 2A and 2B, carrier frequency f1 may be an unlicensed carrier frequency. However, this is only for illustrative purposes, and not intended to limit the scope of the present disclosure. In some other implementations, carrier frequency f1 may be a licensed carrier frequency.

Each cell on carrier frequency f1 may broadcast the identification information of its corresponding PLMN(s) in the system information (e.g., SIB1). For example, cell C1 may broadcast PLMN ID #1 of PLMN #1 to which cell C1 belongs; cell C2 may broadcast PLMN ID #2 of PLMN #2 to which cell C2 belongs; cell C3 may broadcast PLMN ID #3 of PLMN #3 to which cell C3 belongs; and cell CK may broadcast PLMN ID #2 of PLMN #2 to which cell CK belongs. If a cell belongs to more than one PLMN, the cell may broadcast the corresponding PLMN identification information in the system information (e.g., SIB1).

In the example implementation, cells C1 through CK may be ranked by a UE based on a received radio signal quality (e.g., RSRP and/or RSRQ), for example, from the strongest to the weakest. The UE may read the system information of the N1-strongest cells on carrier frequency f1. The UE may obtain the identification information of PLMNs from the system information broadcast by these cells (e.g., N1-strongest cells). In some of the present implementations, the value of N1 may be predefined (e.g., defined by 3GPP specifications), preconfigured to the UE (e.g., stored in a USIM and/or stored in a UICC), configured by cell(s) (e.g., via system information and/or via dedicated signaling), or determined based on UE implementation. For example, if N1=3, the N1-strongest cells may include cells C1, C2 and C3, where cell C1 may be the highest-ranked cell on carrier frequency f1, then cell C2 (the next (e.g., second) highest-ranked cell), and then cell C3 (the next highest-ranked cell after cell C2, or the third highest-ranked cell). The UE may obtain the identification information (e.g., including PLMN ID #1, PLMN ID #2 and PLMN ID #3) of PLMNs from cells C1, C2 and C3 in the broadcast system information of cells C1, C2 and C3. The AS entity of the UE may report a list of available/found PLMNs (e.g., including PLMN ID #1, PLMN ID #2 and PLMN ID #3) to the NAS entity of the UE for PLMN selection. The NAS entity of the UE may then select one of the reported available/found PLMNs as the outcome of the PLMN selection procedure. For example, PLMN #2 may be selected because it is mapped to one PLMN in the list maintained or stored by the UE. In one implementation, the UE may read the system information of the N4-strongest cells on carrier frequency f1, wherein the signal strength of N4-strongest cells may be above a threshold (e.g., fulfill the S criterion). The UE may obtain the identification information of PLMNs from the system information broadcast by these cells (e.g., N4-strongest cells). In some of the present implementations, the value of N4 may be predefined (e.g., defined by 3GPP specifications), preconfigured to the UE (e.g., stored in a USIM and/or stored in a UICC), configured by cell(s) (e.g., via system information and/or via dedicated signaling), or determined based on UE implementation. In one implementation, if the UE may find N0-strongest cells, where N0 is less than N1 in the N1-strongest cell case or N0 is less than N4 in the N4-strongest cell case, the UE may obtain the identification information of PLMNs from the system information broadcast by these cells (e.g., N0-strongest cells). The AS entity of the UE may report the list of available/found PLMNs (e.g., including the obtained identification information of PLMNs) to the NAS entity of the UE for PLMN selection. The NAS entity of the UE may then select one of the reported available/found PLMNs as the outcome of the PLMN selection. In some of the present implementations, if the UE cannot select a PLMN, or if the UE cannot select a suitable cell, when the UE performs the PLMN selection or cell (re)selection based on the N0 or N1 configuration on a carrier frequency, the UE may deprioritize this carrier frequency.

Once the PLMN is selected, the UE may perform the cell selection procedure to search for a suitable cell to camp on. For example, the UE may search for the N2-strongest cells on carrier frequency f1, where N2 is a positive integer. In some of the present implementations, the value of N2 may be predefined (e.g., defined by 3GPP specifications), preconfigured to the UE (e.g., stored in a USIM and/or stored in a UICC), configured by cell(s) (e.g., via system information and/or via dedicated signaling), or determined based on UE implementation. As shown in FIG. 2B, if N2=3, the N2-strongest cells may include cells C1, C2 and C3. Cell C1 may be the highest-ranked cell on carrier frequency f1, then cell C2 (the next (e.g., second) highest-ranked cell), and then cell C3 (the next highest-ranked cell after cell C2, or the third highest-ranked cell).

As described above, each of cells C1, C2 and C3 may broadcast the identification information of its corresponding PLMN(s) in the system information (e.g., SIB1). Based on the system information, the UE may know that cells C1, C2 and C3 belong to PLMN #1, PLMN #2 and PLMN #3, respectively, which means the N2-strongest cells on carrier frequency f1 belong to different PLMNs. The UE may determine whether the suitable cell can be found in the N2-strongest cells (e.g., cells C1, C2 and C3) on carrier frequency f1, by checking whether these cells belong to the selected PLMN or a PLMN that is indicated as being equivalent to a registered PLMN of the UE. As illustrated in FIG. 2B, cell C2 may be selected as the suitable cell for the UE to camp on because cell C2 has the strongest/best received radio signal quality (e.g., RSRP and/or RSRQ) among all cells (e.g., cells C2 and CK) belonging to the selected PLMN (e.g., PLMN #2) on carrier frequency f1. In one implementation, cell C2 may be selected as the suitable cell for the UE to camp on because cell C2 is the highest-ranked cell among cells (e.g., cells C2 and CK) belonging to the selected PLMN (e.g., PLMN #2).

It should be noted that even though the values of N1 and N2 are the same in the example implementation, in some of the present implementations, the values of N1 and N2 may be independently (pre)configured. In some other implementations, the value of N2 may depend on that of N1. N2 may or may not have the same value as N1.

In some of the present implementations, the value(s) of one or more of N1, N2, N0, and N4 may be independently (pre)configured. In some other implementations, the value of one of N1, N2, N0, and N4 may depend on the value of another one of N1, N2, N0, and N4.

Figure 3:
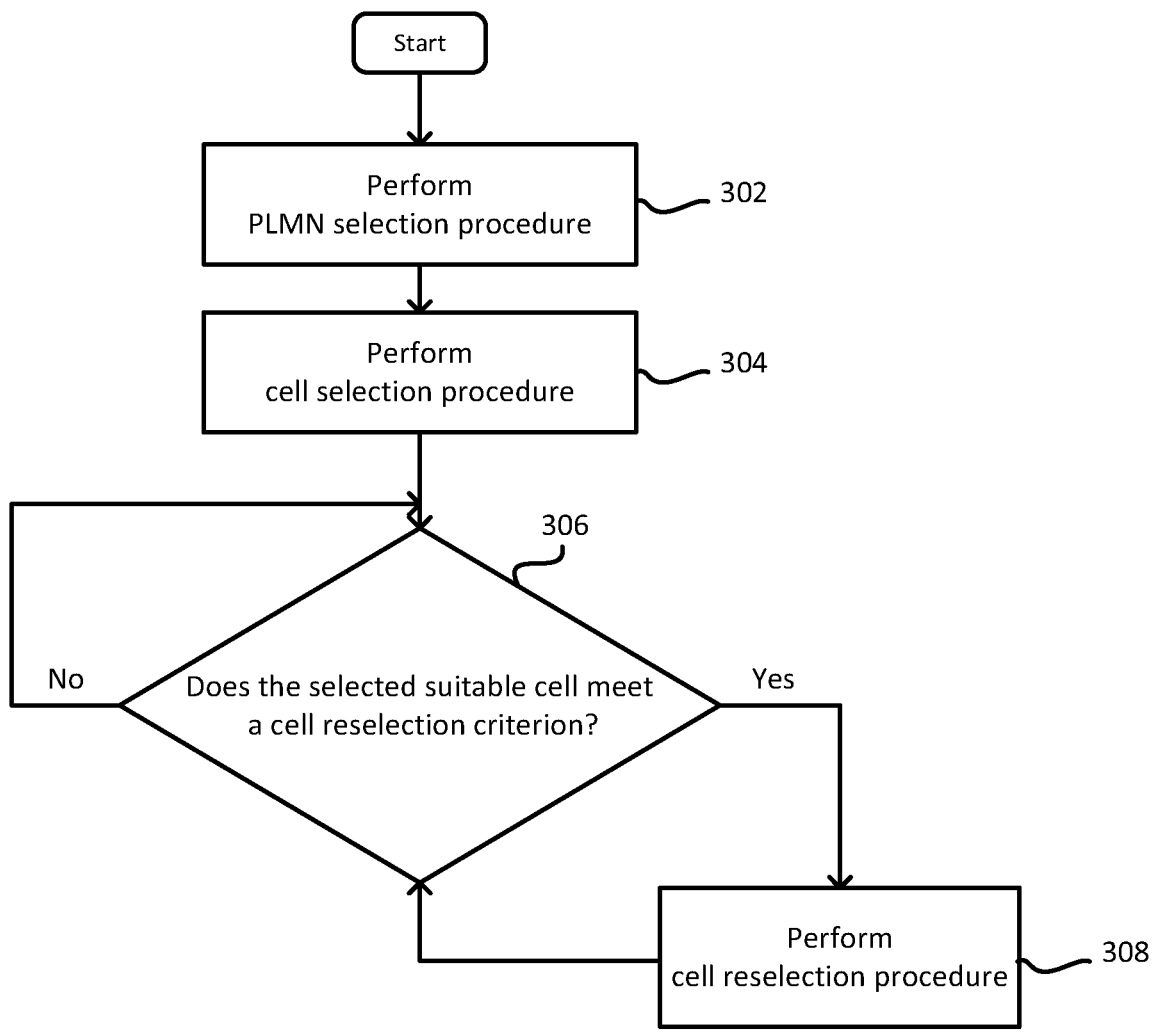
FIG. 3 illustrates a flowchart for a method of performing PLMN selection and cell (re)selection procedures on an unlicensed spectrum, in accordance with an example implementation of the present disclosure.

FIG. 3 illustrates a flowchart for a method of performing PLMN selection and cell (re)selection procedures on an unlicensed spectrum, in accordance with an example implementation of the present disclosure. As shown in FIG. 3, the method includes actions 302, 304, 306 and 308.

In action 302, a UE may perform a PLMN selection procedure to select a PLMN.

In action 304, the UE may perform a cell selection procedure to select a suitable cell to camp on. The suitable cell may belong to the selected PLMN.

In action 306, the UE may determine whether the selected suitable cell meets a cell reselection criterion (e.g., the R criterion). The cell reselection criterion may be related to a change in the measured metric value (e.g., the S criterion) of the suitable cell. For example, once the signal quality of the selected suitable cell is getting worse and deteriorates below a predetermined threshold, the cell reselection criterion may be fulfilled and trigger the UE to perform a cell reselection procedure to find a new suitable cell, as illustrated in action 308. Conversely, in action 306, if the selected suitable cell does not meet the cell reselection criterion, the UE may keep detecting whether the current suitable cell meets the cell reselection criterion, as illustrated in FIG. 3. It should be noted that when the UE reselects the new suitable cell in action 308, the method may proceed back to action 306, where the UE may continue to determine whether the reselected suitable cell meets a cell reselection criterion (e.g., the R criterion).

In one implementation, when the UE camps on a cell (e.g., a selected suitable cell during cell (re)selection procedures), the UE may regularly search for a better cell according to the cell reselection criteria. If the UE finds a better cell, the UE may select a better cell as the suitable cell to camp on. In one implementation, the UE may reselect a new suitable cell if at least one of the two conditions are met: (1) the new suitable cell is better than the current serving/camped cell according to the cell reselection criteria during a time interval, and (2) more than 1 second has elapsed since the UE began camping on the current serving/camped cell.

Figure 4A:
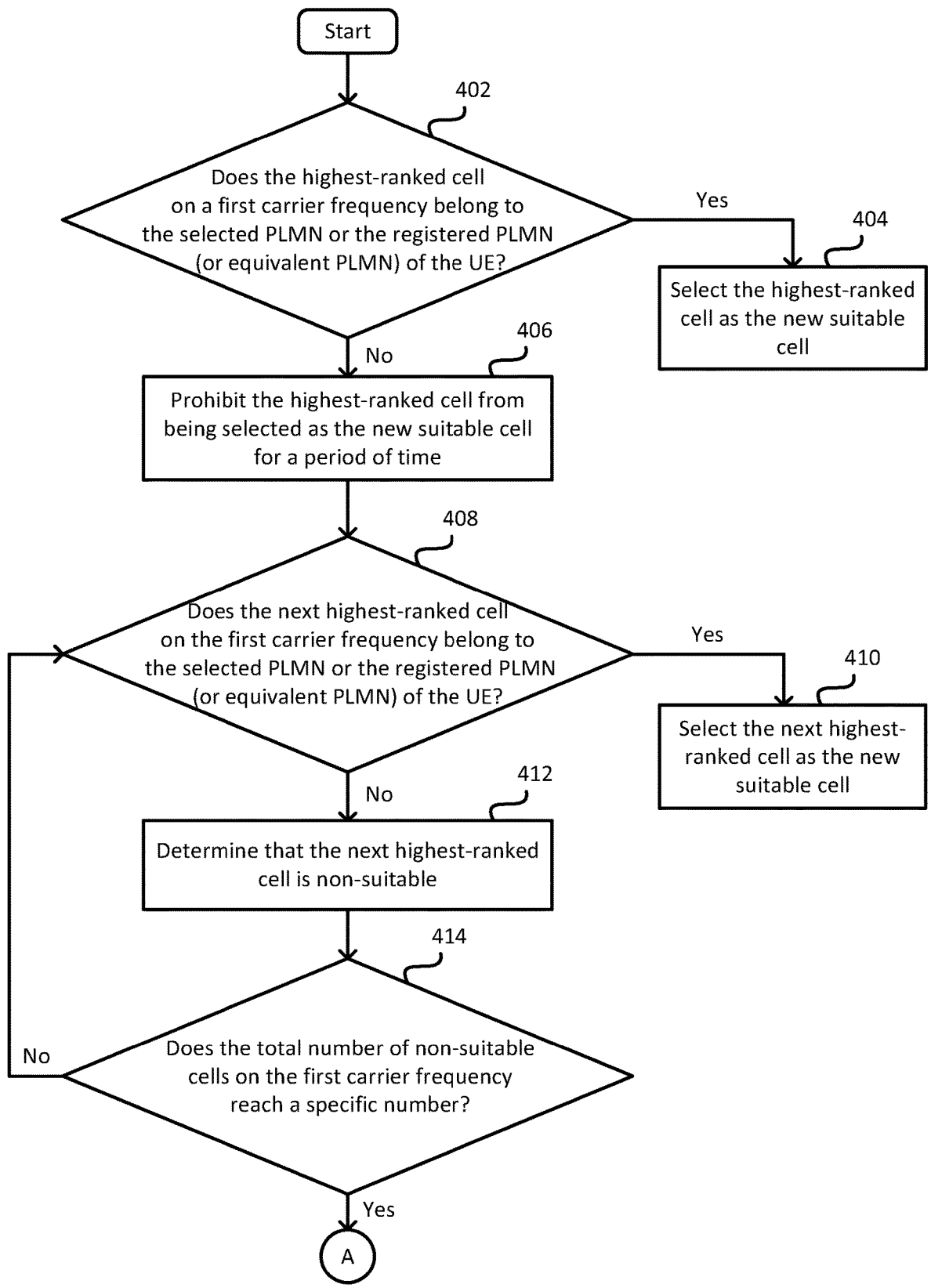
FIG. 4A illustrates a flowchart for a cell reselection procedure, in accordance with an example implementation of the present disclosure.

FIG. 4A illustrates a flowchart for a cell reselection procedure, in accordance with an example implementation of the present disclosure.

In action 402, a UE may determine whether the highest-ranked cell on a first carrier frequency belongs to the selected PLMN or the registered PLMN (or the equivalent PLMN) of the UE.

If the outcome of action 402 is Yes, the UE may select the highest-ranked cell as the new suitable cell in action 404. In this case, the UE may switch from the original suitable cell to the new suitable cell to camp on. Conversely, if the outcome of action 402 is No, the UE may prohibit the highest-ranked cell from being selected as the new suitable cell for a period of time Ta in action 406. The length of Ta may be preconfigured in the UE or configured by the cell(s) (e.g., via system information and/or via dedicated signaling). In one implementation, the maximum value of Ta may be 300 seconds.

In action 408, when the highest-ranked cell is not selected as the suitable cell by the UE to camp on, the UE may further determine whether the next highest-ranked (e.g., the second highest-ranked) cell on the first carrier frequency belongs to the selected PLMN or the registered PLMN (or equivalent PLMN) of the UE.

As described above, cells on a carrier frequency may be ranked by their corresponding measured metric values. For example, the highest-ranked cell and the next highest-ranked cell on the first carrier frequency may be ranked by a received radio signal quality (e.g., RSRP, RSRQ). In such a case, the next highest-ranked cell may have a poorer received radio signal quality than the highest-ranked cell.

In action 410, the UE may select the next highest-ranked cell as the new suitable cell, when it is determined in action 408 that the next highest-ranked cell belongs to the selected PLMN or the registered PLMN (or equivalent PLMN) of the UE. In this case, the new suitable cell (belonging to the selected PLMN or a PLMN that is indicated as being equivalent to a registered PLMN of the UE) may be a non-highest-ranked (e.g., a lower-ranked) cell among all cells on the first carrier frequency.

In action 412, the UE may determine that the next highest-ranked cell is a non-suitable cell when the next highest-ranked cell does not belong to the selected PLMN or the registered PLMN (or equivalent PLMN) of the UE as determined in action 408. In one implementation, the UE may prohibit the next highest-ranked cell from being selected as the new suitable cell for a period of time Tb when the next highest-ranked cell is determined as a non-suitable cell. The length of Tb may be preconfigured in the UE (e.g., stored in a USIM and/or stored in a UICC) or configured by the cell(s) (e.g., via system information and/or via dedicated signaling). In one implementation, the maximum value of Tb may be 300 seconds.

In action 414, the UE may determine whether the total number of non-suitable cells on the first carrier frequency reaches a specific number. In the example implementation, the value of the specific number may a positive integer. In some of the present implementations, the specific number may be predefined (e.g., defined by 3GPP specifications), preconfigured to the UE (e.g., stored in a USIM and/or stored in a UICC), configured by cell(s) (e.g., via system information and/or via dedicated signaling) or determined based on UE implementation.

Figure 5:
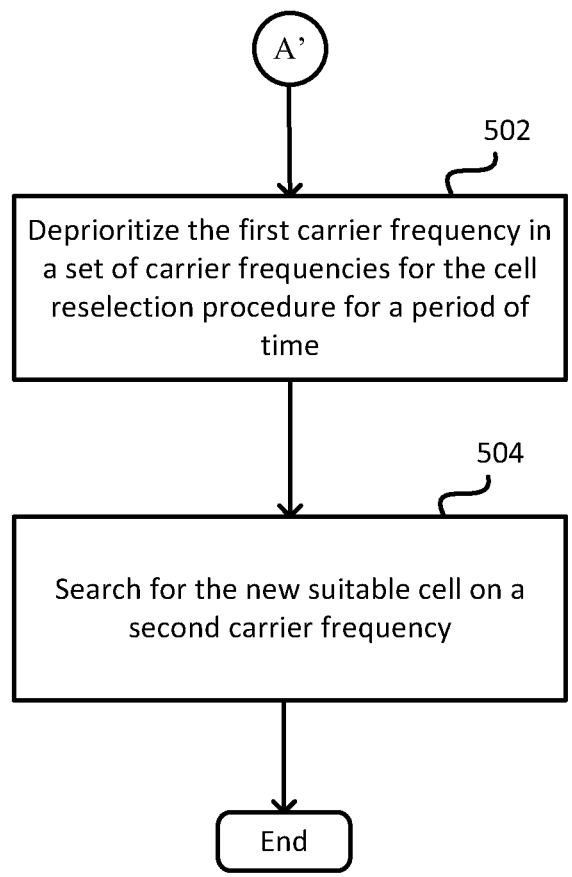
FIG. 5 illustrates a flowchart for a cell reselection procedure performed when a UE cannot find a new suitable cell on a carrier frequency, in accordance with an example implementation of the present disclosure.

If the outcome of action 414 is Yes, the procedure may go to node A, which continues to node A' in FIG. 5. If the outcome of action 414 is No, the procedure may go back to action 408, in which the UE may determine whether the next highest-ranked cell belongs to the selected PLMN or the registered PLMN (or equivalent PLMN) of the UE. In one implementation, the term "the next highest-ranked cell" may refer to a cell with the rank after the rank of the cell just being checked not to be selected.

In the example implementation, when the highest-ranked cell is not selected as the suitable cell, the UE may iteratively perform a process on the first carrier frequency, until the new suitable cell is found on the first carrier frequency or a specific number of cells on the first carrier frequency are determined as non-suitable. As illustrated in FIG. 4, actions 408, 412 and 414 may be iteratively performed multiple times if the UE is continuously unable to find a new suitable cell on the first carrier frequency.

Figure 4B:
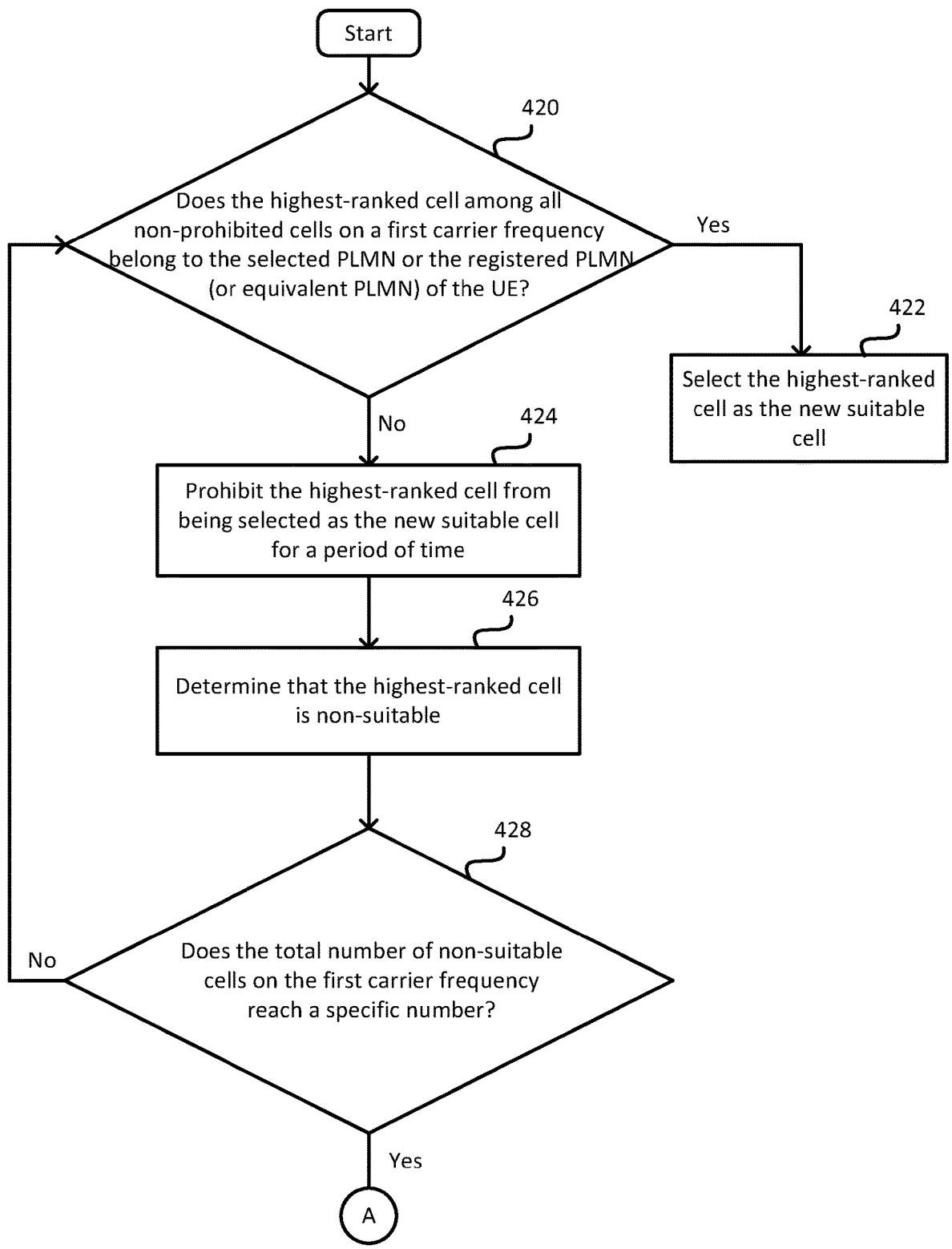
FIG. 4B illustrates a flowchart for a cell reselection procedure, in accordance with an example implementation of the present disclosure.

FIG. 4B illustrates a flowchart for a cell reselection procedure, in accordance with another example implementation of the present disclosure.

In action 420, a UE may determine whether the highest-ranked cell among all non-prohibited cells on a first carrier frequency belongs to the selected PLMN or the registered PLMN (or the equivalent PLMN) of the UE. The non-prohibited cells may be the cells that are not currently prohibited from being selected as the new suitable cell for the UE to camp on. The prohibited cells may be the cells that are currently prohibited from being selected (e.g., via a cell-specific timer) as the new suitable cell for the UE to camp on.

If the outcome of action 420 is Yes, the UE may select the highest-ranked cell as the new suitable cell in action 422. In this case, the UE may switch from the original suitable cell to the new suitable cell to camp on. Conversely, if the outcome of action 420 is No, the UE may prohibit the highest-ranked cell from being selected as the new suitable cell for a period of time (e.g., Ta) in action 424. The length of Ta may be preconfigured in the UE (e.g., stored in a USIM and/or stored in a UICC) or configured by the cell(s) (e.g., via system information and/or via dedicated signaling). In one implementation, the maximum value of Ta may be 300 seconds.

In action 426, the UE may determine that the highest-ranked cell is a non-suitable cell because the highest-ranked cell does not belong to the selected PLMN or the registered PLMN (or equivalent PLMN) of the UE.

In action 428, the UE may determine whether the total number of non-suitable cells on the first carrier frequency reaches a specific number. In the example implementation, the value of the specific number may be a positive integer. In some of the present implementations, the specific number may be predefined (e.g., defined by 3GPP specifications), preconfigured to the UE (e.g., stored in a USIM and/or stored in a UICC), configured by cell(s) (e.g., via system information and/or via dedicated signaling) or determined based on UE implementation.

If the outcome of action 428 is Yes, the procedure may go to node A, which continues to node A' in FIG. 5. If the outcome of action 428 is No, the procedure may go back to action 420.

In some of the present implementations, action 428 may be omitted. In such cases, once the highest-ranked cell is determined as a non-suitable cell in action 426, the procedure may directly proceed to node A. In some other implementations, actions 424, 426 and 428 may be omitted. In such cases, once the outcome of action 420 is No, the procedure may directly proceed to node A.

FIG. 5 illustrates a flowchart for a cell reselection procedure performed when a UE cannot find a new suitable cell on the first carrier frequency, in accordance with an example implementation of the present disclosure. It should be noted that although actions 502 and 504 are delineated as separate actions represented as independent blocks in FIG. 5, these separately delineated actions should not be construed as necessarily order dependent. The order in which the actions are performed in FIG. 5 is not intended to be construed as a limitation, and any number of the described blocks may be combined in any order to implement the method, or an alternate method. Moreover, at least one of actions 502 and 504 may be omitted during the cell reselection procedure in some of the present implementations.

In the example implementation, when the UE finds that the total number of non-suitable cells on the first carrier frequency reaches the specific number, the cell reselection procedure may continue to node A' of FIG. 5. Then in action 502, the UE may deprioritize the first carrier frequency in a set of carrier frequencies for the cell reselection procedure for a period of time (e.g., Tc). For example, the UE may search for the new suitable cell on different carrier frequencies during the cell reselection procedure, where each carrier frequency may be assigned with a corresponding reselection priority. Once the first carrier frequency is deprioritized (e.g., the reselection priority of the first carrier frequency is reduced), the UE may select another carrier frequency with a higher reselection priority than the first carrier frequency, in order to search for the new suitable cell on the selected carrier frequency during the later cell reselection procedure. In one implementation, once the UE deprioritizes the first carrier frequency in a set of carrier frequencies for the cell reselection procedure, the UE may consider the first carrier frequency to have the lowest priority among the set of carrier frequencies. In some of the present implementations, the length of Tc may be preconfigured in the UE or configured by the cell(s) (e.g., via system information and/or via dedicated signaling). Tc may or may not have the same value as Ta.

In action 504, the UE may search for the new suitable cell on a second carrier frequency. In some of the present implementations, the second carrier frequency may be an unlicensed carrier frequency. In some other implementations, the second carrier frequency may be a licensed carrier frequency. In one implementation, after the UE deprioritizes the first carrier frequency, the second carrier frequency may have the highest priority among the set of carrier frequencies for cell reselection procedure.

Figure 6:
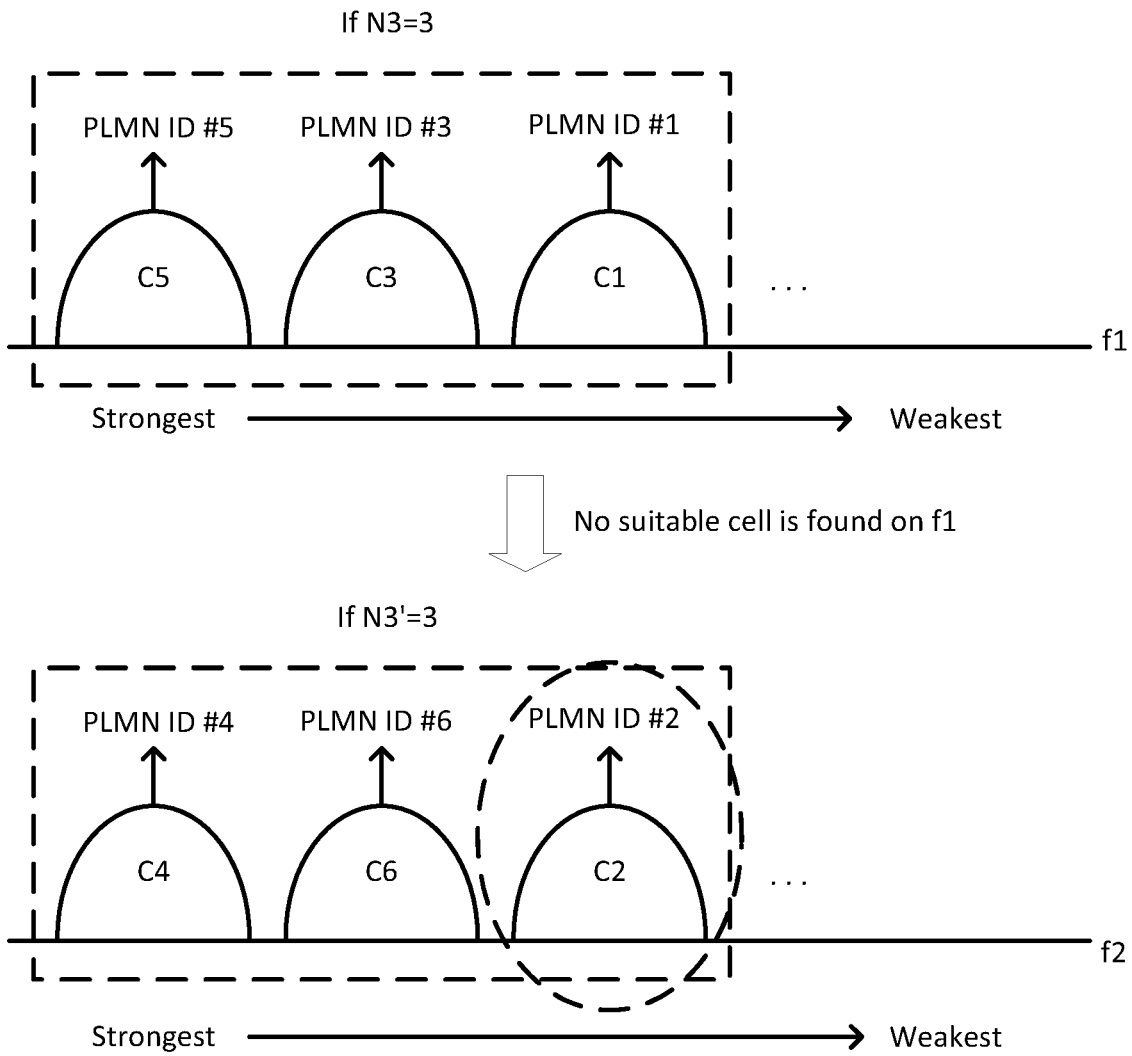
FIG. 6 is a schematic diagram illustrating a cell reselection procedure, in accordance with an example implementation of the present disclosure.

FIG. 6 is a schematic diagram illustrating a cell reselection procedure, in accordance with an example implementation of the present disclosure. As illustrated in FIG. 6, cells C5, C3 and C1 on carrier frequency f1 may be ranked by the received radio signal quality (e.g., RSRP and/or RSRQ), from the strongest to the weakest. Thus, cell C5 may be the highest-ranked cell on carrier frequency f1, then cell C3, and then cell C1. It should be noted that because the channel/network conditions may change over time, the ranking of cells on carrier frequency f1 may be different as compared with FIGS. 2A and 2B.

In the example implementation, cells C5, C3 and C1 may broadcast the identification information (e.g., PLMN ID #5, PLMN ID #3 and PLMN ID #1) of their corresponding PLMNs in the system information (e.g., SIB1). Based on the system information, the UE may know that cells C5, C3 and C1 belong to PLMN #5, PLMN #3 and PLMN #1, respectively. If the selected/registered/equivalent PLMN is PLMN #2, the UE may determine that cell C5 (the highest-ranked cell on carrier frequency f1) is non-suitable because cell C5 does not belong to PLMN #2. Based on the same reason, the UE may also determine that cells C3 and C1 are non-suitable cells. Because the UE cannot find the new suitable cell from the N3-strongest cells (if N3=3) on carrier frequency f1, the UE may then search for the new suitable cell on another carrier frequency f2, which may be a licensed carrier frequency or an unlicensed carrier frequency.

On carrier frequency f2, the UE may follow the methods illustrated in FIGS. 4 and 5 to continue the cell reselection procedure. For example, the UE may determine whether the highest-ranked cell on carrier frequency f2 belongs to the selected PLMN or the PLMN that is indicated as being equivalent to the registered PLMN of the UE. If the outcome of the determination is Yes, the UE may select the highest-ranked cell on carrier frequency f2 as the new suitable cell. Conversely, if the outcome of the determination is No, the UE may prohibit the highest-ranked cell on carrier frequency f2 from being selected as the new suitable cell for a period of time (Td). In some of the present implementations, Td and Ta may be independently (pre)configured, so the length of Td may be independent of the length of Ta. In some other implementations, the length of Td may depend on the length of Ta. Td may or may not have the same length as Ta. In one implementation, the maximum value of Td may be 300 seconds.

In some of the present implementations, when the highest-ranked cell on carrier frequency f2 is not selected as the new suitable cell, the UE may iteratively perform a process on carrier frequency f2 until the new suitable cell is found from the N3'-strongest cells on carrier frequency f2 or the total number of non-suitable cells on carrier frequency f2 reaches N3', where N3' is a positive integer. In some of the present implementations, the value of N3' may be predefined (e.g., defined by 3GPP specifications), preconfigured to the UE (e.g., stored in a USIM and/or stored in a UICC), configured by cell(s) (e.g., via system information and/or via dedicated signaling), or determined based on UE implementation. In some of the present implementations, the value of N3' may be independent of the value of N3. In some other implementations, the value of N3' may depend on the value of N3. N3' may or may not have the same value as N3. In one implementation, the UE may not read the system information from all of the N3'-strongest cells before the UE finds and camps on the new suitable cell on carrier frequency f2. Once the UE finds and camps on the new suitable cell on carrier frequency f2, the UE may not further read the system information from the next highest-ranked cell with the rank after that of the new suitable cell. Once the UE finds and camps on the new suitable cell on carrier frequency f2, the UE may not further measure the received radio signal quality of the remaining cells on carrier frequency f2 for this cell reselection procedure. Once the UE finds and camps on the new suitable cell on carrier frequency f2, the UE may not further rank the remaining cells on carrier frequency f2 for this cell reselection procedure.

As illustrated FIG. 6, if N3'=3, the N3'-strongest cells may include cells C4, C6 and C2, where cell C4 may be the highest-ranked cell on carrier frequency f2, then cell C6, and then cell C2. Cells C4, C6 and C2 may broadcast the identification information (e.g., PLMN ID #4, PLMN ID #6 and PLMN ID #2) of their corresponding PLMNs in the system information (e.g., SIB1). Based on the system information, the UE may know that cells C4, C6 and C2 belong to PLMN #4, PLMN #6 and PLMN #2, respectively, and (re)select cell C2 as a new suitable cell because cell C2 belongs to the selected PLMN #2.

Figure 7:
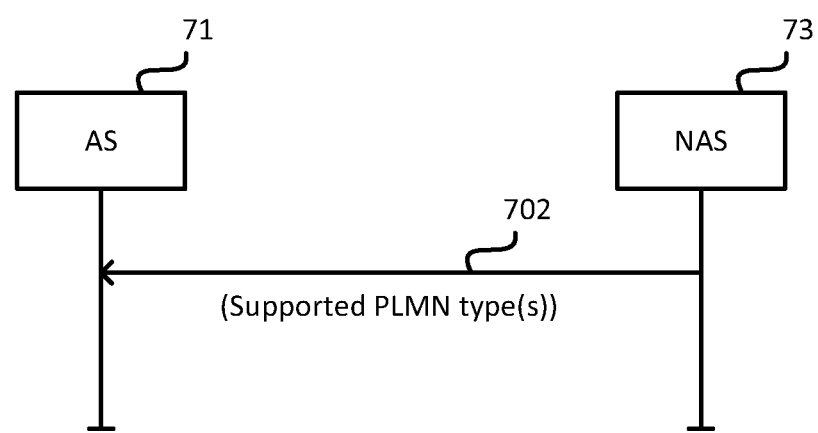
FIG. 7 is a schematic diagram illustrating a message flow between the AS entity and the NAS entity of a UE, in accordance with an example implementation of the present disclosure.

FIG. 7 is a schematic diagram illustrating a message flow between the AS entity of the UE and the NAS entity of a UE, in accordance with an example implementation of the present disclosure.

As illustrated in FIG. 7, the NAS entity 73 of the UE may provide a message to the AS entity 71 of the UE in action 702. The message may indicate which of one or more PLMN types are supported by the UE. Based on the message, the AS entity 71 may or may not modify the list of available PLMNs to be reported to the NAS entity 73. For example, the AS entity 71 may filter out some PLMNs, with PLMN types not supported by the UE, from the list of PLMNs to be reported to the NAS entity 73. In some of the present implementations, the one or more PLMN types may include a public PLMN type, a private PLMN type, and a public and private PLMN type. In one implementation, if the NAS entity 73 of the UE does not provide a message to the AS entity 71 of the UE, it means that the UE supports (or needs) to select a public PLMN as the outcome of PLMN selection. In one implementation, if the NAS entity 73 of the UE provides a message to the AS entity 71 of the UE, and if the message includes a first indicator corresponding to the private PLMN type, it means that the UE supports (or needs) a private PLMN as the outcome of PLMN selection. In one implementation, if the NAS entity 73 of the UE provides a message to the AS entity 71 of the UE, and if the message includes a second indicator corresponding to the public and private PLMN types, it means that the UE supports (or needs) a public or private PLMN as the outcome of PLMN selection.

As mentioned above, multiple networks (e.g., PLMNs) may operate on unlicensed or licensed spectrums. In addition, multiple networks (e.g., PLMNs) may share the same unlicensed carrier or the same licensed carrier. Each network may be public, private or both. Public networks (e.g., public PLMNs) may (but not limited to) be provided by operators or virtual operators, which may provide radio services to the public subscribers. The public networks may own one or more licensed spectrums and support the radio access technology on the licensed spectrum(s) as well. The public networks may support the radio access technology on unlicensed spectrums as well. On the other hand, private networks (e.g., private PLMNs) may (but not limited to) be provided by micro-operators, factories, or enterprises, which may provide radio services to their private users (e.g., employees or machines). The private networks may support the radio access technology on the unlicensed spectrum(s). If the private PLMNs own a licensed spectrum, the corresponding private networks may support the radio access technology on the licensed spectrum as well.

It should be noted that even though the term "public PLMN" may be used in some of the present implementations, such a term may be replaced by another term "public network" because the techniques described therein are not intended to be limited to the public PLMN(s) and may be applicable to other types of public network(s). Similarly, even though the term "private PLMN" may be used in some of the present implementations, such a term may be replaced by another term such as "private network" or "non-public network" (NPN) because the techniques described therein are not intended to be limited to the private PLMN(s) and may be applicable to other types of private/non-public network(s). In one implementation, the private network scenario may be a Stand-alone Non-Public Network (SNPN), i.e., operated by an NPN operator and not relying on network functions provided by a (public) PLMN. In another implementation, the NPN scenario may be a Public Network Integrated NPN (PNI-NPN), i.e., a non-public network deployed with the support of a (public) PLMN. The SNPN(s) may be identified by PLMN ID and/or Network ID (NID) broadcast in SIB1 of a cell supporting SNPN. The PNI-NPN may be identified by PLMN ID and/or Cell Access Group (CAG) ID broadcast in SIB1 of a cell supporting PNI-NPN. The identification information of an SNPN (e.g., an SNPN ID) may include a PLMN ID and/or an NID. The identification information of a PNI-NPN (e.g., a PNI-NPN ID) may include a PLMN ID and/or a CAG ID. Each of the PLMN ID, the SNPN ID, and the PNI-NPN ID may be referred to as a PLMN-related ID. In some of the present implementations, the PLMN-related ID may be included in the identification information of a PLMN.

In some of the present implementations, public PLMNs and private PLMNs may support several deployment scenarios. For example, the deployment scenarios may include the carrier aggregation between the licensed band (e.g., NR, for the Primary Cell (PCell)) and the unlicensed band (e.g., NR-U, for the Secondary Cell (SCell)), wherein the unlicensed SCell may have both DL and UL, or DL-only; the dual connectivity (or multi-connectivity) between the radio access technology on the licensed band (e.g., LTE, NR, for the PCell) and the radio access technology on the unlicensed band (e.g., NR-U, for the Primary Secondary Cell (PSCell)); the dual connectivity (or multi-connectivity) between the licensed band (e.g., LTE, for the PCell) and the stand-alone radio access technology (e.g., stand-alone NR-U) on the unlicensed band; an NR cell with DL in unlicensed band and UL in licensed band; and the stand-alone unlicensed radio access technology (e.g., stand-alone NR-U). In some of the present implementations, private PLMNs may mainly support (but not limited to) the stand-alone unlicensed radio access technology (e.g., stand-alone NR-U).

During the PLMN selection procedure, the AS entity of the UE may report available PLMNs to the NAS entity of the UE on request from the NAS entity of the UE or automatically in some of the present implementations. In some of the present implementations, the NAS entity of the UE may inform the AS entity of the UE of which PLMN type (e.g., public, private, both) the UE supports (as illustrated in FIG. 7).

In some of the present implementations, the AS entity of the UE may be preconfigured with the information of which PLMN type (e.g., public, private, both) the UE supports. In some of the present implementations, if the UE supports pubic PLMNs only, the AS entity of the UE may report the available public PLMNs to the NAS entity of the UE. In some of the present implementations, if the UE supports the private PLMNs only, the AS entity of the UE may report the available private PLMNs to the NAS entity of the UE. In some of the present implementations, if the UE supports pubic PLMNs and private PLMNs, the AS entity of the UE may report the available public PLMNs and/or private PLMNs to the NAS entity of the UE.

In some of the present implementations, the public PLMNs and the private PLMNs may use the same Mobile Country Code (MCC) but different Mobile Network Codes (MNCs). In some of the present implementations, if multiple PLMNs share the same MCC, the cell may transmit both the MCC and the MNC of one of the PLMNs (e.g., via system information and/or via dedicated signaling), and transmit only the MNCs (with an absence of the MCC) of the other PLMNs.

In some of the present implementations, a cell may broadcast the identification information of one or more PLMNs operating other cells on the same carrier frequency (e.g., on an unlicensed carrier frequency). For example, the one or more PLMNs may be called as "neighboring PLMN(s)." The UE may read the identification information broadcast by the cell (e.g., in SIB1 or other System Information (SI)) and obtain the PLMN ID(s) of the neighboring PLMN(s) that operate cells on the same carrier frequency. The AS entity of the UE may report the found PLMN ID(s), including the identification information of PLMNs operating this cell and PLMNs operating neighboring cells on the same carrier frequency, to the NAS entity of the UE. The NAS entity of the UE may then select a PLMN as an outcome of the PLMN selection procedure based on the reported PLMN ID(s).

In some of the present implementations, the system information from the cell(s) on a carrier frequency (e.g., licensed carrier frequency, unlicensed carrier frequency) may include PLMN type information that indicates at least one PLMN type (e.g., public, private, or both) associated with the cells. For example, a cell on an unlicensed spectrum may broadcast an indicator to indicate that the cell is shared by public PLMNs, private PLMNs, or both of the public and private PLMNs. In some of the present implementations, each PLMN ID broadcast by the cell may be accompanied by an indicator to indicate the PLMN type associated with the corresponding PLMN ID. For example, the cell may broadcast several PLMN lists. One PLMN list may include the PLMN IDs of public PLMNs, one PLMN list may include the PLMN IDs of private PLMNs, and one PLMN list may include the PLMN IDs of both public and private PLMNs.

In some of the present implementations, the cell may broadcast the indicator(s) and the identification information of PLMN(s) (e.g., PLMN ID list(s)) via the SIB1 or other SI. If there is no additional indicator broadcasted by the cell operating on the unlicensed spectrum, the UE may, by default, treat the PLMNs identified by the broadcast identification information of PLMN(s) (e.g., PLMN ID list) as public PLMNs. In some of the present implementations, if the UE supports public PLMNs only, the AS entity of the UE may treat the public PLMN IDs broadcast by the cell as the candidate available PLMNs. In some of the present implementations, if the UE supports private PLMNs only, the AS entity of the UE may treat the private PLMN IDs (e.g., PLMN IDs and/or NIDs, PLMN IDs and/or CAG IDs) broadcast by the cell as the candidate available PLMNs. In some of the present implementations, if the UE supports both public PLMNs and private PLMNs, the AS entity of the UE may treat both the public PLMN IDs and the private PLMN IDs broadcast by the cell as the candidate available PLMNs. In some of the present implementations, the AS entity of the UE may select the available PLMNs from the candidate available PLMNs based on a predefined rule. For example, if the signal quality of a cell broadcasting the identification information of one or more candidate available PLMNs fulfills a high-quality criterion, the one or more candidate available PLMNs may be selected as the available PLMN(s). The AS entity of the UE may report the available PLMN(s) to the NAS entity of the UE for PLMN selection.

In some of the present implementations, on each unlicensed carrier frequency, the UE may search for the N-strongest cells (e.g., the N1-strongest cells, the N2-strongest cells, the N3-strongest cells, or the N3'-strongest cells as illustrated in FIGS. 2A, 2B and 6) and read their system information, in order to find out which PLMN(s) the cells belong to Taking FIG. 2A as an example, where N=N1=3, cells C1, C2 and C3 are the N1-strongest cells that meet the high-quality criterion on carrier frequency f1. According to the system information of cells C1, C2 and C3, the UE may know that cells C1, C2 and C3 belong to PLMN #1, PLMN #2 and PLMN #3, respectively. In some of the present implementations, on each unlicensed carrier, the UE may search for at most N-strongest cells and read their system information, in order to find out which PLMN(s) the cells belong to.

In some of the present implementations, the value of N may be predefined (e.g., defined by 3GPP specifications), preconfigured to the UE (e.g., stored in a USIM and/or stored in a UICC), or configured by cell(s) (e.g., via system information and/or via dedicated signaling), determined based on UE implementation.

In some of the present implementations, the UE may search for the N-strongest cells which supports the UE's PLMN type (e.g., public, private, both), and read their system information. For example, if the UE supports public PLMNs, the UE may search for the N-strongest cells which support public PLMNs and read their system information. In such a case, the searched maximum N strongest cells support the UE's PLMN type (e.g., public, private, both).

In some of the present implementations, the UE may search for the N-strongest cells regardless of their supporting PLMN types and read their system information. In such a case, the searched N-strongest cells may possibly not support the UE's PLMN type. In some of the present implementations, if the UE cannot search for the N-strongest cells on the unlicensed carrier frequency, the UE may turn to search for the X-strongest cells on the unlicensed carrier frequency and read their system information, where X is a positive integer smaller than N. The value of X may be preconfigured or left for UE implementations.

In some of the present implementations, the search for PLMNs may be stopped/modified (e.g., change the N or X value) on request from the NAS entity of the UE. The UE may optimize the PLMN search upon the N-strongest cells and/or X-strongest cells by using the stored information (e.g., information of carrier frequencies) and optionally also the information of the cell parameters from previously received measurement control information elements.

In some of the present implementations, the UE may measure the channel occupancy ratio of all carrier frequencies. The UE may select the carrier frequency with the lowest channel occupancy ratio and read the system information of cells on the selected carrier frequency.

If the UE reads one or more PLMN IDs in each of the N-strongest cells, each found PLMN may be reported to the NAS entity of the UE as the high quality PLMN(s). In some of the present implementations, if the UE reads one or more PLMN IDs in each of the N-strongest cells, each found PLMN, which belongs to the PLMN type supported by the UE (e.g., public, private, or both), may be reported to the NAS entity of the UE as the high quality PLMN(s). In such cases, the found PLMN(s) to be reported to the NAS entity of the UE may be regarded as the available PLMN(s) reported by the AS entity of the UE to NAS entity of the UE.

In some of the present implementations, the high-quality criterion for finding the N-strongest cells may be fulfilled if the measured metric value of a cell is greater than, or equal to, a threshold value (e.g., −110 dBm). The measured metric value may be at least one of a RSRP value, a RSRQ value, a Received Signal Strength Indicator (RSSI) value, a Signal to Interference-plus-Noise Ratio (SINR) value, and a channel occupancy ratio value. The threshold value may be predefined, preconfigured, or configured by the cell through the system information (e.g., via the SIB1 or other SI) or dedicated signaling (e.g., via RRC messages). For example, the measured RSRP value may be greater than or equal to a threshold value, e.g., −110 dBm. If the system information and the dedicated signaling are adopted, the threshold value may be stored by the UE and used in a later PLMN selection procedure. For example, the UE may use the stored threshold value given by the SI or dedicated signaling for the PLMN selection. Whether a cell is "strong" or not may depend on the measured metric value of the cell. For example, if the RSRP value is used as the measured metric value, the UE may create a cell list for an unlicensed carrier frequency according to the order of RSRP values of the cells on the unlicensed carrier frequency. For example, the cell list may include cell IDs (or other identification information of the cells) which are ordered by their corresponding cells' measured metric values, from the highest measured metric value to the lowest measured metric value. In some of the present implementations, the UE may measure an unlicensed carrier frequency or a licensed carrier frequency for a time period (Tm). The value of Tm may be predefined, preconfigured, or depend on UE implementation. If Tm is not configured to the UE, a default value for Tm may be adopted. In some of the present implementations, Tm may be dynamically configured by the cell via the system information (e.g., the SIB1 or other SI) or the dedicated signaling (e.g., via RRC messages) to the UE. In some of the present implementations, the measured metric value may be obtained from measurements during the time period Tm. In some of the present implementations, the measured metric value may be obtained by averaging a set of measured metric values sampled in the time period Tm.

In some of the present implementations, if the N-strongest cells fulfill the high-quality criterion, the AS entity of the UE may report the identification information of PLMNs (e.g., PLMN ID(s), PLMN ID(s) and/or NID(s), PLMN ID(s) and/or CAG ID(s)) found from the broadcast system information by the N-strongest cells to the NAS entity of the UE, without reporting the measured metric value(s). In some of the present implementations, when the N-strongest cells fulfill the high-quality criterion, the AS entity of the UE may report the identification information of PLMNs (e.g., PLMN ID(s), PLMN ID(s) and/or NID(s), PLMN ID(s) and/or CAG ID(s)) found from the broadcast system information by the N-strongest cells and the measured metric values of the N-strongest cells to the NAS entity of the UE. In some of the present implementations, when the N-strongest cells do not fulfill the high-quality criterion but the UE has detected the identification information of PLMNs (e.g., PLMN ID(s), PLMN ID(s) and/or NID(s), PLMN ID(s) and/or CAG ID(s)) from the broadcast system information by the N-strongest cells, the AS entity of the UE may report the detected identification information of PLMNs and the measured metric values of the N-strongest cells to the NAS entity of the UE. In some of the present implementations, the measured metric value of each PLMN found on the same N-strongest cells may be the same. In some of the present implementations, the measured metric value of each PLMN found on the N-strongest cells that does not fulfill the high-quality criterion may be the same.

In some of the present implementations, if the number of cells fulfilling the high-quality criterion is greater than, or equal to, 1 but less than N, the AS entity of the UE may report the identification information of PLMNs found on the cells fulfilling the high-quality criterion to the NAS entity of the UE. In some of the present implementations, if the number of cells fulfilling the high-quality criterion is greater than, or equal to, 1 but less than N, the AS entity of the UE may report the identification information of PLMNs found on the cells not fulfilling the high-quality criterion, and the measured metric value of each PLMN found on the cells not fulfilling the high-quality criterion, to the NAS entity of the UE. In some of the present implementations, if the number of cells fulfilling the high-quality criterion is zero, the AS entity of the UE may report the identification information of PLMNs found on the N-strongest cells together with the corresponding measured metrics of the N-strongest cells. In some of the present implementations, if the ranking of the measured metric value of a cell is in the top N but the UE cannot read any PLMN ID from this cell, the UE may not consider such a cell as one of the N-strongest cells. In some of the present implementations, the UE may then store the information (e.g., the relative cell ID) of the cell and take it into account for a further cell (re)selection in which the cell may be given a lower priority to be selected as a suitable cell than other cells. The UE may remove the information (e.g., the relative cell ID) of the cell after the cell selection procedure, after a cell reselection procedure, or after a period of time.

In some of the present implementations, the AS entity of the UE may select a PLMN as the outcome of the PLMN selection procedure. This type of PLMN selection procedure may be referred to as a procedure of PLMN selection by UE AS.

In some of the present implementations, during the procedure of PLMN selection by UE AS, the NAS entity of the UE may provide a potential PLMN list to the AS entity of the UE. The potential PLMN list may include at least one PLMN-related ID. In some implementations, the PLMN-related ID(s) may be PLMN ID(s), SNPN ID(s), or PNI-NPN ID(s). The SNPN ID(s) may include PLMN ID(s) and/or NID(s). The PNI-NPN ID(s) may include PLMN ID(s) and/or CAG ID(s).

The AS entity of the UE may select one or more PLMN-related IDs from the potential PLMN list and report the selected PLMN-related ID(s) in a selected PLMN list to the NAS entity of the UE. In some of the present implementations, the AS entity of the UE may inform the NAS entity of the UE of the selected PLMN-related ID(s) by reporting the index(ices) of the potential PLMN list(s). In some of the present implementations, if the AS entity of the UE cannot select any PLMN-related ID from the potential PLMN list, the AS entity of the UE may report a default value to the NAS entity of the UE to indicate the selected PLMN. In some of the present implementations, the selected PLMN's PLMN-related ID may be in the beginning (or in the end) of the selected PLMN list.

In some of the present implementations, the search for PLMNs may be stopped once the AS entity of the UE has selected a PLMN. In some of the present implementations, the search for PLMNs may be stopped once the AS entity of the UE has found the N-strongest cells. In some of the present implementations, the PLMN IDs broadcast by the N-strongest cells may not match the potential PLMN list. In some of the present implementations, one or more PLMN IDs broadcast by the N-strongest cells may match the potential PLMN list and the AS entity of the UE may select the PLMN(s) which matches the potential PLMN list. In some of the present implementations, the search for PLMNs may be stopped once the AS entity of the UE has found all cells that fulfill the high-quality criterion or the N-strongest cells that fulfill the high-quality criterion.

In some of the present implementations, the PLMN-related ID of the selected PLMN by the AS entity of the UE may be broadcast by one or more of the N-strongest cells via the SIB1 or other SI. In such a case, the N-strongest cells may fulfill the high-quality criterion. In some of the present implementations, the AS entity of the UE may select the PLMN with its PLMN-related ID being broadcast by the most cells that fulfill the high-quality criterion. These cells may be operated in the intra-frequency or in the inter-frequency. In some of the present implementations, the AS entity of the UE may select the PLMN with its PLMN-related ID being broadcast by the most cells for which the UE has been able to read the PLMN-related IDs. In some of the present implementations, the AS entity of the UE may select the PLMN with its PLMN-related ID being broadcast by the cell which has the strongest measured metric value among cells broadcasting the UE's potential PLMN list.

In some of the present implementations, if the NAS entity of the UE verifies/approves the PLMN selected by the AS entity of the UE, the NAS entity of the UE may provide a positive indicator to the AS entity of the UE. After receiving the positive indicator, the AS entity of the UE may perform the cell selection procedure to select a suitable cell belonging to the selected PLMN to camp on. Conversely, if the NAS entity of the UE fails to verify (or rejects) the selected PLMN, the NAS entity of the UE may provide a negative indicator to the AS entity of the UE. After receiving the negative indicator, the AS entity of the UE may trigger the PLMN selection procedure. In some of the present implementations, after receiving the negative indicator, the AS entity of the UE may bar the reported PLMN for a period of time to avoid selecting it again. In some of the present implementations, after receiving the negative indicator, the AS entity of the UE may report another PLMN in the selected PLMN list to the NAS entity of the UE. If no other PLMN is in the selected PLMN list, the AS entity of the UE may trigger the PLMN selection procedure. In some of the present implementations, if the NAS entity of the UE fails to verify (or rejects) the selected PLMN, the NAS entity of the UE may select a PLMN from the selected PLMN list by itself. In some of the present implementations, the NAS entity of the UE may indicate to the AS entity of the UE which PLMN is selected, if the NAS entity of the UE selects the PLMN.

In some of the present implementations, the AS entity of the UE may select a PLMN and report a selected PLMN list to the NAS entity of the UE. The selected PLMN list may include the selected PLMN's identification information (e.g., the PLMN-related ID(s) of the selected PLMN(s)). For example, the PLMN-related ID of the selected PLMN may be, by default, arranged in the first or last entry of the selected PLMN list. In some of the present implementations, an indicator may be used in the selected PLMN list to mark the selected PLMN. In some of the present implementations, once the AS entity of the UE confirms that the selected PLMN has been verified by the NAS entity of the UE (e.g., the AS entity of the UE reports a selected PLMN to the NAS entity of the UE, and then receives a positive indicator from the NAS entity of the UE), the UE may perform the cell selection procedure to select a suitable cell belonging to the selected PLMN to camp on. In some of the present implementations, the suitable cell may fulfill the high-quality criterion. In some of the present implementations, if the cell where the UE receives the PLMN ID of the selected PLMN does not fulfill the high-quality criterion, the UE may perform the cell (re)selection procedure to find another cell as the suitable cell (e.g., the UE does not directly select such cell as the suitable cell).

After PLMN selection, the UE may perform a cell selection procedure to find out a suitable cell belonging to the selected PLMN on a carrier frequency. In some of the present implementations, the UE may perform measurements for cell selection and reselection purposes. The NAS entity of the UE may control the RAT(s). For example, during the cell selection procedure, the NAS entity of the UE may request the AS entity of the UE to perform measurements on an unlicensed spectrum (e.g., including one or more unlicensed carrier frequencies) for the unlicensed RAT(s) (e.g., NR-U). The NAS entity of the UE may indicate the RAT(s) associated with the selected PLMN (e.g., equivalent PLMN(s) or registered PLMNs) to the AS entity of the UE. In some of the present implementations, the NAS entity of the UE may maintain at least one of a list of forbidden registration area(s) and a list of equivalent/registered PLMN(s). In some of the present implementations, the NAS entity of the UE may define the range of forbidden registration area(s) by GPS coordination. The UE may select a suitable cell based on the RRC_IDLE or RRC_INACTIVE state measurements and the cell selection criteria. In some of the present implementations, the UE may utilize the RRC_CONNECTED state measurements for cell (re)selection.

In unlicensed carrier frequencies, because multiple PLMNs may possibly use the same carrier frequency without any coordination, the best cell found by a UE on an unlicensed carrier frequency may not belong the selected/registered/equivalent PLMN. In some of the present implementations, the UE may select a non-best cell on the unlicensed carrier frequency as a suitable cell to camp on, if the best cell does not belong to the selected/registered/equivalent PLMN. In some of the present implementations, the non-best cell may have a better received radio signal quality than other cells belonging to the selected/registered/equivalent PLMN. Taking FIG. 2B as an example, the best cell C1 does not belong to the selected PLMN #2, so the UE may skip cell C1 and select the next-best cell C2 (which belongs to the selected PLMN #2) as the suitable cell to camp on. In addition, cell C2 may have a better received radio signal quality than other cells belonging to the selected PLMN #2 (e.g., cell CK).

In some of the present implementations, for an initial cell selection, the UE may scan all Radio Frequency (RF) channels in the unlicensed bands according to its capabilities to find a suitable cell, if the UE is indicated to utilize the unlicensed RAT(s). On each carrier frequency within an unlicensed spectrum, the UE may read the system information of the cells and search for the strongest cell belonging to the UE's selected/registered/equivalent PLMN. That is, among all cells in each carrier frequency which broadcast the identification information of the UE's selected/registered/equivalent PLMN, the UE may find the strongest one as the suitable cell. Conversely, among all cells in each carrier frequency, a cell (e.g., cell C1 illustrated in FIG. 2B) that does not broadcast the selected/registered/equivalent PLMN's identification information may not be selected as the suitable cell, even if the cell has a better received radio signal quality than other cells.

In some of the present implementations, the UE may be configured with a threshold value. The threshold value may be preconfigured or broadcast by the cells. In some of the present implementations, the threshold value may be a cell-specific threshold value that is broadcast by each cell. Such a cell-specific threshold value may be applied to the corresponding cell to determine whether the cell has a good signal quality to be selected as a suitable cell. For example, on each carrier frequency, the UE may search for the cells with their measured metric values above the threshold value. Among the searched cells, the UE may find a suitable cell. As illustrated in FIG. 2B, each of cells C1, C2, C3 on carrier frequency f1 may have a measured metric value above the threshold value. Among cells C1, C2, C3, the UE may consider cell C2 as the suitable cell because it belongs to the selected PLMN #2.

In some of the present implementations, the UE may require the information of carrier frequencies, which the UE may receive from measurement control information elements of a camped/serving cell and/or from the system information of a camped/serving/detected cell, for performing cell (re)selection procedures. In some of the present implementations, the UE may require the information of cell parameters, which the UE may receive from measurement control information elements of a camped/serving cell and/or from the system information of a camped/serving/detected cells, for performing cell (re)selection procedures. In some of the present implementations, if a cell does not broadcast the threshold value, the UE may always treat the cell as a suitable cell. For example, the UE may assume that the threshold value for the cell is negative infinity. In some of the present implementations, if a cell does not broadcast the threshold value, the UE may use a default threshold value to perform the comparison between the received signal quality and the threshold value. In some of the present implementations, the threshold value broadcast by a cell may be set to positive infinity when the cell bars all UEs. In some of the present implementations, the UE may set the threshold value for a cell to be positive infinity when the UE bars the corresponding cell.

In some of the present implementations, on each carrier frequency, the UE may search for the cells that satisfy the following two conditions: (1) such cells belong to the UE's selected/registered/equivalent PLMN, and (2) the measured metric values of such cells are above a threshold value. Among the searched cells on each frequency, the UE may select the strongest one (e.g., with the best measured metric value) as the suitable cell. In some of the present implementations, once the UE finds a cell that satisfies the above two conditions, the UE may directly select the cell as the suitable cell if the cell is not barred to the UE.

In some of the present implementations, the UE may use the cell selection criterion S to find the suitable cell. In some of the present implementations, the cell selection criterion S may be different between a licensed spectrum and an unlicensed spectrum. For example, for a cell selection procedure on the licensed spectrum, the cell selection criterion S in a normal coverage may be fulfilled when:

$$Srxlev > 0 \text{ and } Squal > 0,$$

where:

$$Srxlev = Q_{rxlevmeas} - (Q_{rxlevmin} + Q_{rxlevminoffset}) - P_{compensation} - Qoffset_{temp}, \text{ and}$$

$$Squal = Q_{qualmeas} - (Q_{qualmin} - Q_{qualminoffset}) - Qoffset_{temp}$$

where:

| | |
|---|---|
| Srxlev | Cell selection Receive (RX) level value (dB) |
| Squal | Cell selection quality value (dB) |
| $Qoffset_{temp}$ | Offset temporarily applied to a cell (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dB m). If the UE supports Supplementary Uplink (SUL) frequency for this cell, Qrxlevmin is obtained from q-RxLevMin-sul, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and |

-continued

| | |
|---|---|
| | SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signaled for the concerned cell, this cell specific offset is added to achieve the required minimum quality level in the concerned cell. |
| $Q_{rxlevminoffset}$ | Offset to the signaled $Q_{rxlevmin}$ taken into account in the Srxlev evaluation as a result of a periodic search for a higher priority PLMN while camped normally in a Visited PLMN (VPLMN) |
| $Q_{qualminoffset}$ | Offset to the signaled $Q_{qualmin}$ taken into account in the Squal evaluation as a result of a periodic search for a higher priority PLMN while camped normally in a VPLMN |
| $P_{compensation}$ | If the UE supports the additionalPmax in the NS-PmaxList, if present, in SIB1, SIB2 and SIB4:<br>$\max(P_{EMAX1} - P_{PowerClass}, 0) - (\min(P_{EMAX2}, P_{PowerClass}) - \min(P_{EMAX1}, P_{PowerClass}))$ (dB);<br>else:<br>$\max(P_{EMAX1} - P_{PowerClass}, 0)$ (dB) |
| $P_{EMAX1}$, $P_{EMAX2}$ | Maximum TX power level of a UE may use when transmitting on the uplink in the cell (dBm) defined as $P_{EMAX}$. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4, else $P_{EMAX1}$ and $P_{EMAX2}$ are obtained from the p-Max and NR-NS-PmaxList respectively in SIB1, SIB2 and SIB4 for normal UL. |
| $P_{PowerClass}$ | Maximum RF output power of the UE (dBm) according to the UE power class. |

In some of the present implementations, other criteria may be applied to the unlicensed spectrum operations. For example, an SINR value may be a measured metric value. The UE may compare the signal strength from a cell with the interference caused from other cells. In some of the present implementations, the SINR value may be defined by a Synchronization Signal (SS)-SINR (SS-SINR) value. For example, the SS-SINR value may be defined as (but not limited to) the linear average over the power contribution (in [W]) of the resource elements carrying (secondary) SSs divided by the linear average of the noise and interference power contribution (in [W]) over the resource elements carrying (secondary) SSs within the same frequency bandwidth. In some of the present implementations, the time resource(s) for measuring the SS-SINR value may be confined within an SS/Physical Broadcast Channel (PBCH) Block Measurement Time Configuration (SMTC) window duration. The UE may receive the SMTC for measuring a cell via dedicated signaling or system information from this cell or other cells.

In some of the present implementations, the SINR value of a cell may be greater than, or equal to, a threshold (e.g., $S_{SINR} > 0$, $S_{SINR} = Q_{SINR} - Q_{SINR\_th} + R_{SINR}$). $S_{SINR}$ may be the S criterion associated to the SINR value. $Q_{SINR}$ may be the measured cell RX SINR value (dB). $Q_{SINR\_th}$ may be the threshold associated to the SINR value. $R_{SINR}$ may be the remainder items if necessary. Each item may either be broadcast by the cell to the UE, be unicast via dedicated signaling by the cell, or be preconfigured to the UE (e.g., stored in a USIM and/or stored in a UICC). In some of the present implementations, $R_{SINR}$ may be zero. $Q_{SINR\_th}$ may be preconfigured or broadcast in the Master Information Block (MIB) or SIB1 from the cell. $Q_{SINR\_th}$ may be cell-specific or unique for the system. For example, if $Q_{SINR\_th}$ is cell-specific, it may be applied to the cell which broadcasts the $Q_{SINR\_th}$ value.

For cell selection procedures under multi-beam operations, the average SINR among beams of a cell may be considered. For example, the beam-average SINR of a cell may be greater than, or equal to, a threshold (e.g., $S_{SINR\_av} > 0$, $S_{SINR\_av} = Q_{SINR\_av} - Q_{SINR\_th\_av} + R_{SINR\_av}$). $S_{SINR\_av}$ may be the S criterion associated to the beam-average SINR. $Q_{SINR\_av}$ may be the beam-average SINR of a cell. $Q_{SINR\_th\_av}$ may be the threshold associated with the beam-average SINR. $R_{SINR\_av}$ may be the remainder items if necessary. Each item may either be broadcast by the cell to the UE, be unicast via dedicated signaling by the cell, or be preconfigured to the UE (e.g., stored in a USIM and/or stored in a UICC). In some of the present implementations, $R_{SINR\_av}$ may be zero. $Q_{SINR\_th\_av}$ may be cell-specific or unique for the system. If $Q_{SINR\_th}$ is cell-specific, it may be applied to the cell which broadcasts the $Q_{SINR\_th}$ value.

In some of the present implementations, the UE may derive an SINR value for a beam. Thus, for each beam, there may be an SINR value. There are many approaches to define the beam-specific SINR. For example, if there are "B" beams, $Q_{SINR\_th\_av}$ may be derived by the summation of all beam-specific SINR values divided by "B." In another example, if there are "B" beams, $Q_{SINR\_th\_av}$ may be derived by the summation of all received signals of beams divided by the summation of all interference and noise of all beams. The measurement quantity may be the SS/PBCH block of the cell. Each SS/PBCH block of the cell may correspond to a beam. The value of "B" may be a positive integer.

In some of the present implementations, a threshold (e.g., $Q_{SINR\_Beam\_th}$) may be configured. Only the beams with an SINR value above the threshold (e.g., $Q_{SINR\_Beam\_th}$) may be used for derivation of the beam-average SINR value. For example, if there are "B1" beams with their SINR values above the threshold (e.g., $Q_{SINR\_Beam\_th}$), $Q_{SINR\_th\_av}$ may be derived by the summation of the B1 beam-specific SINR values divided by "B1." In some of the present implementations, if there are "B1" beams, $Q_{SINR\_th\_av}$ may be derived by the summation of all received signals of beams divided by the summation of all interference and noise of all beams. If there are no beams with their beam-specific SINR values above the threshold (e.g., $Q_{SINR\_Beam\_th}$), the highest SINR value among the beams may be used for the S criterion. For example, the highest SINR value among the beams may be used as $Q_{SINR\_av}$. In some of the present implementations, if "B1" is higher than, or equal to, another value "B2," only the SINR values of the B2 beams may be used to derive the beam-average SINR value. For example, the highest "B2"

SINR values among the "B1" SINR values may be used. In another example, the lowest "B2" SINR values among the "B1" SINR values may be used. In still another example, the "B2" SINR values may be randomly selected from the "B 1" SINR values. In some of the present implementations, the "B2" value may be preconfigured or broadcast by the cell. The "B2" value may be sent by the cell via dedicated signaling. On the other hand, the "$Q_{SINR\_Beam\_th}$" value may be preconfigured or broadcast by the cell to the UE. The "$Q_{SINR\_Beam\_th}$" value may be sent by the cell via the dedicated signaling. The values of "B1" and "B2" may be positive integers.

In some of the present implementations, the carrier frequency bandwidth for the RAT on an unlicensed spectrum (e.g., NR-U) may be (but not limited to) 20 MHz. If wideband is considered, the carrier frequency for the RAT on the unlicensed spectrum may be a multiple of 20 MHz. For example, an unlicensed carrier frequency may have a channel bandwidth of 100 MHz. For another example, a 100 MHz bandwidth may be divided into five different unlicensed carrier frequencies, with each having a channel bandwidth of 20 MHz.

In some of the present implementations, the cell reselection procedure on an unlicensed spectrum (e.g., NR-U) may consider the (reselection) priority and ranks. In some of the present implementations, absolute priorities of different NR frequencies, different NR-U frequencies or inter-RAT frequencies may be provided to the UE in the system information (e.g., SIB1, SIB2, SIB3, SIB4, SIB5), in the dedicated signaling (e.g., RRC (Connection) Release message, RRC (Connection) Release message with suspend configuration, RRC (Connection) Release message without suspend configuration), or by inheriting from another RAT during the inter-RAT cell (re)selection. In some of the present implementations, in the case of system information, the NR frequency, the NR-U frequency or the inter-RAT frequency may be listed without providing a priority (e.g., the field cellReselectionPriority may be absent for that frequency). If the priorities are provided in the dedicated signaling (e.g., RRC (Connection) Release message, RRC (Connection) Release message with suspend configuration, RRC (Connection) Release message without suspend configuration), the UE may ignore all the priorities provided in system information.

In some of the present implementations, if the NR and the NR-U are considered as the same RAT, the NR frequency and the NR-U frequency may be inter-frequencies. In some of the present implementations, if the NR and the NR-U are considered as different RATs, the NR frequency and the NR-U frequency may be inter-RAT frequencies. In some of the present implementations, different unlicensed carrier frequencies for the same RAT (e.g., NR-U) may be considered as inter-frequencies.

In some of the present implementations, the cell may broadcast the priority information (e.g., inter-RAT frequency priority and/or inter-frequency priority). For example, the priority information may be included in the SIB1 and/or other SI (e.g., the SIB2, the SIB3, the SIB4, and the SIB5). The cell may inform the UE of the priority information via the dedicated signaling (e.g., an RRC Release message). In some of the present implementations, different RATs may have different priorities (e.g., RAT-specific priority). In some of the present implementations, different carrier frequencies may have different priorities, e.g., frequency-specific priority. For example, for an E-UTRA RAT, the frequency priority information may include the carrier frequency of E-UTRA, the cell reselection priority corresponding to the carrier frequency, and optionally the cell reselection sub-priority. For an NR RAT, the frequency priority information may include the carrier frequency of NR, the cell reselection priority corresponding to the carrier frequency, and optionally the cell reselection sub-priority corresponding to the carrier frequency. For an NR-U RAT, the frequency priority information may include the carrier frequency of NR-U, the cell reselection priority corresponding to the carrier frequency, and optionally the cell reselection sub-priority corresponding to the carrier frequency. In some of the present implementations, the frequency priority information of NR RAT may include the carrier frequency of NR-U RAT, the cell reselection priority corresponding to the carrier frequency, and optionally the cell reselection sub-priority corresponding to the carrier frequency.

In some of the present implementations, based on the measurement results, the UE may rank the serving cell and the non-serving cells (e.g., intra-frequency cells, inter-frequency cells and inter-RAT cells). For the RAT on an unlicensed spectrum (e.g., NR-U), the intra-frequency cells may belong to the same PLMN as that of the serving cell, or belong to different PLMNs from that of the serving cell. Similarly, for the RAT on the unlicensed spectrum (e.g., NR-U), the inter-frequency cells may belong to the same PLMN as that of the serving cell, or different PLMNs from that of the serving cell. In some of the present implementations, the UE may rank the serving cell and the non-serving cells (e.g., intra-frequency cells, inter-frequency cells and inter-RAT cells) belonging to the same PLMN as that of the serving cell. In some of the present implementations, the UE may rank the serving cell and the non-serving cells (e.g., intra-frequency cells, inter-frequency cells, inter-RAT cells), which may not exactly belong to the same PLMN as that of the serving cell.

In some of the present implementations, the RAT on an unlicensed spectrum may be another RAT compared to the RATs on a licensed spectrum. For example, the NR-U having a PCell on an unlicensed spectrum may be a RAT different from the NR (which may be assumed to have a PCell on a licensed spectrum). For example, the E-UTRA on a licensed spectrum may be another RAT compared to NR-U operating on an unlicensed spectrum. In some of the present implementations, the inter-RAT information may include the E-UTRA specific information, the NR specific information, and NR-U specific information.

In some of the present implementations, when evaluating Srxlev and Squal of non-serving cells for cell reselection purposes, the UE may use parameters provided by the serving cell. Some rules may be used by the UE to limit required measurements. In some of the present implementations, if the serving cell fulfills Srxlev>$S_{IntraSearchP}$ and Squal>$S_{IntrasearchQ}$, the UE may choose not to perform intra-frequency measurements. Otherwise, the UE may perform intra-frequency measurements. $S_{IntrasearchP}$ may be the Srxlev threshold (in dB) for intra-frequency measurements, for example, in terms of RSRP. $S_{IntrasearchQ}$ may be the Squal threshold (in dB) for intra-frequency measurements, for example, in terms of RSRQ. In some of the present implementations, if the serving cell fulfills $S_{SINR}$>$S_{IntrasearchSINR}$, the UE may choose not to perform intra-frequency measurements. Otherwise, the UE may perform intra-frequency measurements. $S_{IntraSearchSINR}$ may be the threshold (in dB) for intra-frequency measurements, for example, in terms of SINR. In some of the present implementations, if the serving cell fulfills $S_{SINR\_av}$>$S_{IntraSearchSINR\_av}$, the UE may choose not to perform intra-frequency measurements. Otherwise, the UE may perform intra-frequency measurements. $S_{IntrasearchSINR\_av}$ may be the threshold (in dB) for intra-frequency measurements, for example, in terms of average SINR. If multi-beam operation on the unlicensed spectrum is used, $S_{IntraSearchSINR\_av}$ may be configured.

Some rules may be required for an inter-frequency cell reselection procedure on the unlicensed spectrum(s). In some of the present implementations, for an unlicensed inter-frequency with a reselection priority higher than the reselection priority of the current frequency, the UE may perform measurements on the unlicensed inter-frequency. The current frequency may be an unlicensed carrier frequency or a licensed carrier frequency. The format of the cell reselection priority indicator may be N bits corresponding to a $2^N$ value. For example, the cell reselection priority indicator may mean the lowest priority when its value is 0. In addition, a higher value of the cell reselection indicator may correspond to a higher cell reselection priority. In some of the present implementations, a cell reselection sub-priority value may be added to the value of the cell reselection priority indicator for the corresponding frequency or RAT. That is, the cell reselection sub-priority value and the value of the cell reselection priority indicator may constitute an absolute priority value for the concerned RAT, or constitute an absolute priority value for the concerned carrier frequency of the corresponding RAT. In some of the present implementations, if the dedicated signaling (e.g., the RRC (Connection) Release message, RRC Release message with suspend configuration, RRC Release message without suspend configuration) does not include the cell reselection priority indicator, the UE may apply the cell reselection priority indicator broadcast in the system information. In some of the present implementations, if the system information does not include the cell reselection priority indicator, the UE may apply the stored cell reselection priority indicator. In some of the present implementations, if the dedicated signaling and the system information do not include the cell reselection priority indicator for the corresponding RAT/frequency, and the UE does not store any cell reselection priority indicator for the corresponding RAT/frequency, the UE may apply a default value as the cell reselection priority indicator for the corresponding RAT/frequency. In some of the present implementations, the default value may be zero, which means that the corresponding RAT/frequency may have the lowest priority. In some of the present implementations, if the dedicated signaling and the system information do not include the cell reselection priority indicator for the corresponding RAT/frequency and the UE does not store any cell reselection priority indicator for the corresponding RAT/frequency, the UE may treat the cells on the corresponding RAT/frequency as barred during the cell reselection procedure. For inter-frequency measurements, at least one of the SINR value, the RSSI value and the channel occupancy ratio value may be used as the measured metrics. For example, the UE may perform measurements on cells in different frequencies based on the SINR values, the average SINR values, the RSSI values or the channel occupancy ratio values. For example, the UE may perform measurements on the frequencies based on the RSSI values or the channel occupancy ratio values. In some of the present implementations, the UE may deprioritize a carrier frequency to be selected in the cell reselection procedure if the measurement results (e.g., the RSSI values or the channel occupancy ratio values) of such a carrier frequency is worse than the measurement results of another frequency with a lower (reselection) priority.

In some of the present implementations, for an unlicensed inter-frequency with a reselection priority equal to or lower than the reselection priority of the current frequency, if the serving cell fulfils $Srxlev>S_{nonIntraSearchP}$ and $Squal>S_{nonIntraSearchQ}$, the UE may decide not to perform measurements on the unlicensed inter-frequencies. In some of the present implementations, if the serving cell fulfils $Srxlev>S_{nonIntraSearchSINR}$, the UE may decide not to perform measurements on the unlicensed inter-frequencies (with a reselection priority equal to or lower than the reselection priority of the current frequency). $S_{nonIntraSearchSINR}$ may be a threshold (in dB) for unlicensed inter-frequency measurements, for example, in terms of SINR. In some of the present implementations, if the serving cell fulfils $Srxlev>S_{nonIntraSearchSINR\_av}$, the UE may decide not to perform measurements on the unlicensed inter-frequencies (with a reselection priority equal to or lower than the reselection priority of the current frequency). $S_{nonIntraSearchSINR\_av}$ may be a threshold (in dB) for unlicensed inter-frequency measurements, for example, in terms of average SINR. If the multi-beam operation on an unlicensed spectrum is used, $S_{nonIntraSearchSINR\_av}$ may be configured. In some of the present implementations, if the conditions are not fulfilled, the UE may perform measurements of the unlicensed inter-frequencies.

In some of the present implementations, if the measured metric value (e.g., the RSSI value or the channel occupancy ratio value) of the current frequency is above a threshold, the UE may not perform measurements on the unlicensed inter-frequencies, regardless of the priority of the unlicensed inter-frequencies. The threshold may be configured by the system information or dedicated signaling.

In some of the present implementations, a UE (e.g., in RRC_CONNECTED state) may report the measurement results (e.g., the RSSI value or the channel occupancy ratio value) of different frequencies (e.g., in the unlicensed spectrum(s) or the licensed spectrum(s)) to the serving cell via the dedicated signaling (e.g., Measurement Report message). Upon receiving the measurement results, the serving cell may adjust the (reselection) priority of different frequencies. Thus, the cell may send the updated (reselection) priority of different frequencies in the system information (e.g., in the SIB1, the SIB2, the SIB3, the SIB4, or the SIB5) or in the dedicated signaling (e.g., in an RRC (Connection) Release message, in an RRC Release message with suspend configuration, in an RRC Release message without suspend configuration) to the UE. Upon acquiring the updated (reselection) priority, the UE may replace the stored value of (reselection) priority with the updated (reselection) priority for cell reselection.

Some rules may be required for the inter-RAT frequency cell reselection between the unlicensed spectrum(s) and the licensed spectrum(s). In some of the present implementations, if the inter-RAT frequency is unlicensed, each unlicensed carrier frequency may correspond to a reselection priority. In some of the present implementations, if the inter-RAT frequency is unlicensed, all unlicensed carrier frequencies may correspond to a reselection priority.

In some of the present implementations, if an unlicensed inter-RAT frequency (e.g., an NR-U frequency) has a reselection priority higher than the reselection priority of the current licensed carrier frequency (e.g., an NR frequency or an E-UTRA frequency), the UE may perform measurements on the unlicensed inter-RAT frequency. In some of the present implementations, if at least one licensed inter-RAT frequency (e.g., an NR frequency or an E-UTRA frequency) has a reselection priority higher than the reselection priority of the current licensed carrier frequency (e.g., an NR frequency or an E-UTRA frequency), the UE may not perform measurements on the unlicensed inter-RAT frequency.

In some of the present implementations, if the licensed inter-RAT frequency (e.g., an NR frequency or an E-UTRA frequency) has a reselection priority higher than the reselection priority of the current unlicensed carrier frequency (e.g., an NR-U frequency), the UE may perform measurements of the licensed inter-RAT frequency having the higher reselection priority.

In some of the present implementations, if the measured metric value of the current unlicensed carrier frequency (e.g., the SINR value, the RSSI value or the channel occupancy ratio value) is below a threshold, the UE may perform measurements on the licensed inter-RAT frequencies (e.g., an NR frequency or an E-UTRA frequency). In some of the present implementations, the threshold of the corresponding measured metric value may be configured in the system information or in the dedicated signaling, from the cell to the UE.

In some of the present implementations, for an unlicensed inter-RAT frequency with a reselection priority equal to or lower than the reselection priority of the current licensed carrier frequency, if the serving cell fulfills $Srxlev > S_{nonIntraSearchP}$ and $Squal > S_{nonIntraSearchQ}$, the UE may choose not to perform measurements on the unlicensed inter-RAT frequencies. $S_{nonIntraSearchP}$ may be the threshold (in dB) for the unlicensed inter-RAT frequency measurement, for example, in terms of RSRP. $S_{nonIntraSearchQ}$ may be the threshold (in dB) for the unlicensed inter-RAT frequency measurement, for example, in terms of RSRQ.

In some of the present implementations, for a licensed inter-RAT frequency with a reselection priority equal to or lower than the reselection priority of the current unlicensed carrier frequency, if the serving cell fulfills a condition of $Srxlev > S_{nonIntraSearchP}$ and $Squal > S_{nonIntraSearchQ}$, the UE may choose not to perform measurements on the licensed inter-RAT frequency. In some of the present implementations, for a licensed inter-RAT frequency with a reselection priority equal to or lower than the reselection priority of the current unlicensed carrier frequency, if the serving cell fulfills a condition of $Srxlev > S_{nonIntraSearchSINR}$, the UE may choose not to perform measurements on the licensed inter-RAT frequency. $S_{nonIntraSearchSINR}$ may be the threshold (in dB) for the licensed inter-RAT frequency measurement, for example, in terms of SINR. In some of the present implementations, for a licensed inter-RAT frequency with a reselection priority equal to or lower than the reselection priority of the current unlicensed carrier frequency, if the serving cell fulfills a condition of $Srxlev > S_{nonIntraSearchSINR\_av}$, the UE may choose not to perform measurements on the licensed inter-RAT frequency. $S_{nonIntraSearchSINR\_av}$ may be the threshold (in dB) for the licensed inter-RAT frequency measurement, for example, in terms of average SINR. If the multi-beam operation on the unlicensed spectrum(s) is used, $S_{nonIntraSearchSINR\_av}$ may be configured. In some of the present implementations, if the conditions mentioned above are not fulfilled, the UE may perform measurements of the licensed inter-RAT frequencies.

In some of the present implementations, if the highest-ranked cell (or the best cell or the strongest cell) on an unlicensed carrier frequency (e.g., the highest-ranked cell is an unlicensed intra-frequency cell or an unlicensed inter-frequency cell) is not suitable to camp on because the highest-ranked cell is a part of the "list of 5G System (5GS) forbidden Tracking Areas (TAs) for roaming", or belongs to a PLMN which is not indicated as being equivalent to the registered PLMN, the highest-ranked cell is barred, the UE may consider the highest-ranked cell as a non-suitable cell to camp on for a maximum time period of T (e.g., 300) seconds. In this case, the UE may consider other cells as candidate cells on the same unlicensed carrier frequency for the cell reselection procedure.

Cells on the unlicensed carrier frequency may be ranked based on their corresponding measured metric values or other absolute priority reselection rules. For example, the highest-ranked cell may be the cell having the best received radio signal quality among cells on the same carrier frequency. It should be noted that the "highest-ranked cell," the "best cell," and the "strongest cell," may be interchangeable terms in some of the present implementations.

In some of the present implementations, the T value for the licensed intra-frequency cell case or for the licensed inter-frequency cell case may be independent of the T value for the unlicensed intra-frequency cell case or for the unlicensed inter-frequency cell case. The T values may be independently configured or predefined for different cases, and the T values may be different. In some of the present implementations, the T value for the licensed intra-frequency cell case or for the licensed inter-frequency cell case may be the same as the T value for the unlicensed intra-frequency cell case or for the unlicensed inter-frequency cell case. In some of such implementations, the T values for different cases may be configured or predefined together.

In some of the present implementations, if the highest-ranked cell on an unlicensed carrier frequency is a non-suitable cell to camp on (e.g., the UE determines that the highest-ranked cell is not suitable for camping on), the UE may not consider cells on the same unlicensed carrier frequency as candidate suitable cells for reselection for a maximum time period of T (e.g., 300) seconds, if at least one cell on other frequencies is ranked by the UE and has a rank value higher than a rank threshold. The rank threshold may be preconfigured, broadcast by the serving cell (e.g., in the SIB2, the SIB3, the SIB4 or the SIB5), or sent via the RRC dedicated signaling (e.g., in an RRC (Connection) Release message, in an RRC Release message with suspend configuration, in an RRC Release message without suspend configuration).

In some of the present implementations, if the highest-ranked cell on an unlicensed carrier frequency is not suitable for camping on, the UE may consider cells on the same unlicensed carrier frequency as non-suitable cells for a maximum time period of T seconds if at least one cell on other frequencies fulfills the cell selection criterion S.

In some of the present implementations, if the highest-ranked cell on an unlicensed carrier frequency is determined as a non-suitable cell, the UE may further consider cells on the same unlicensed carrier frequency as non-suitable cells for a maximum time period of T (e.g., 300) seconds if the measured metric value (e.g., the RSRP value, the RSRQ value or the SINR value) of at least one cell on other frequencies is above a threshold. The threshold may be preconfigured, broadcast by the serving cell (e.g., in the SIB2, the SIB3, the SIB4, the SIB5), or sent via the RRC dedicated signaling (e.g., in an RRC (Connection) Release message, in an RRC Release message with suspend configuration, in an RRC Release message without suspend configuration).

In some of the present implementations, the UE may be redirected, under the licensed RAT (e.g., NR)'s control, to an unlicensed carrier frequency (e.g., to utilize the unlicensed RAT such as the NR-U). If the UE is redirected, under the licensed RAT's control, to the unlicensed carrier frequency for which a timer T is running, any limitation on that unlicensed carrier frequency may be removed. The limitation may include any restriction from allowing the UE to perform cell (re)selection procedures on that unlicensed carrier frequency. For example, the UE may remove the limitation on that unlicensed carrier frequency by stopping the timer T. Thus, the UE may perform measurements on that unlicensed carrier frequency.

In some of the present implementations, the UE may be redirected, under the unlicensed RAT (e.g., NR-U)'s control, to a licensed carrier frequency (e.g., NR). If the UE is redirected under unlicensed RAT (e.g., NR-U) control to a licensed carrier frequency for which the timer T is running, any limitation on that licensed carrier frequency may be removed. The limitation may include any restriction from allowing the UE to perform cell (re)selection procedures on that licensed carrier frequency. For example, the UE may remove the limitation on that licensed carrier frequency by stopping the timer T. Thus, the UE may perform measurements on that licensed carrier frequency.

In some of the present implementations, if an indication (e.g., thresServingLowSINR) is broadcast in the system information and more than Tr (e.g., 1) second has elapsed since the UE began camping on the current serving cell, the UE may perform a cell reselection procedure to select a cell (e.g., a new suitable cell to camp on) on a higher priority frequency than the serving frequency. The cell of a higher priority RAT, a licensed carrier frequency or an unlicensed carrier frequency may fulfill that the SINR value of the cell is above a threshold (e.g., $Thresh_{X,\ HighSINR}$) during a time interval (e.g., $Treselection_{RAT}$). Otherwise, the cell reselection to the cell on the higher priority frequency (e.g., an intra-frequency or an inter-frequency) than the serving frequency may be performed if the cell fulfills $Srxlev > Thresh_{X,\ HighP}$ during a time interval (e.g., $Treselection_{RAT}$) and more than 1 second has elapsed since the UE began camping on the current serving cell.

In some of the present implementations, the frequency channel of the selected cell (e.g., the new suitable cell during the cell reselection procedure), which may correspond to a higher priority RAT, licensed carrier frequency or unlicensed carrier frequency, may fulfill that the RSSI value of the frequency is above a threshold (e.g., $Thresh_{X,\ HighRSSI}$) during a time interval (e.g., $Treselection_{RAT}$). Otherwise, the cell reselection to the cell on a higher priority frequency (e.g., an intra-frequency or an inter-frequency) than the serving frequency may be performed, if the cell fulfills $Srxlev > Thresh_{X,\ HighP}$ during a time interval (e.g., $Treselection_{RAT}$) and more than 1 second has elapsed since the UE began camping on the current serving cell.

In some of the present implementations, if an indication (e.g., thresServingLowCO) is broadcast in the system information and more than Tr (e.g., 1) second has elapsed since the UE camped on the current serving cell, the UE may perform a cell reselection to a cell on a higher priority frequency than the serving frequency. The frequency channel of a cell, of a higher priority RAT, licensed carrier frequency or unlicensed carrier frequency, may fulfill that the channel occupancy ratio value of the frequency is above a threshold (e.g., $Thresh_{X,\ HighCO}$) during a time interval (e.g., $Treselection_{RAT}$). Otherwise, the cell reselection to the cell on the higher priority frequency (e.g., an intra-frequency or an inter-frequency) than the serving frequency may be performed if the cell fulfills $Srxlev > Thresh_{X,\ HighP}$ during a time interval (e.g., $Treselection_{RAT}$) and more than 1 second has elapsed since the UE began camping on the current serving cell.

In some of the present implementations, if there is no special indicator (e.g., thresServingLowSINR, thresServingLowRSSI, thresServingLowCO) broadcast in the system information and more than Tr (e.g., 1) second has elapsed since the UE began camping on the current serving cell, the UE may perform a cell reselection to a cell on a higher priority frequency than the serving frequency. The selected cell (e.g., a new suitable cell to camp on) may fulfill that a cell selection RX level value based on RSRP (e.g., Srxlev) is above a threshold (e.g., $Thresh_{X,\ HighP}$) during a timer interval (e.g., $Treselection_{RAT}$).

In some of the present implementations, the mechanisms mentioned above may be applied to a cell reselection procedure to change the original suitable cell of the UE from a cell in the licensed carrier frequency to a cell in the unlicensed carrier frequency, or from a cell in the unlicensed carrier frequency to a cell in the licensed carrier frequency, or from a cell in the unlicensed carrier frequency to a cell in the unlicensed carrier frequency, or from a cell in the licensed carrier frequency to a cell in the licensed carrier frequency.

In some of the present implementations, if a UE camping on a cell in a source frequency reselects to a cell in a target frequency, the UE may start a timer based on a timer value. Before the timer expires, the UE may not measure and/or reselect a cell in the source frequency. The UE may be configured with the timer value via the system information (e.g., the SIB1, other SI (e.g., the SIB2 or the SIB3)) or the dedicated signaling (e.g., the RRC (Connection) Release message, the suspend configuration in the RRC Release message, the RRC Release message with suspend configuration, the RRC Release message without suspend configuration) by the cell on the source frequency. In some of the present implementations, the timer value may be preconfigured or predefined. In some of the present implementations, the UE may stop the timer if the UE cannot reselect any cell in another frequency. In other words, the UE may deprioritize the source frequency to the lowest priority among all available frequencies (e.g., when the timer is running). In some of the present implementations, if the UE camping on a target cell reselects to another target cell in the third frequency, the UE may stop the timer for the source frequency. Moreover, the UE may start the timer for the target frequency.

In some of the present implementations, the UE may rank all cells on the unlicensed intra-frequency or unlicensed inter-frequency that fulfill the cell selection criterion S. The UE may rank cells based on the cell-ranking criterion $R_s$ for the serving cell and $R_n$ for neighboring cells. In some of the present implementations, the cell-ranking criterion $R_s$ for the unlicensed serving cell and the cell-ranking criterion $R_n$ for the unlicensed neighboring cells (e.g., in the unlicensed intra-frequency or in the equal priority unlicensed inter-frequency) may be defined by $R_s = Q_{meas,\ s} + Q_{rmd,\ s}$ and $R_n = Q_{meas,\ n} + Q_{rmd,\ n}$, where $Q_{meas,\ s}$ may be the measured metric value (e.g., the RSRP value, the RSRQ value, or the SINR value) used in the cell reselection procedure, $Q_{rmd,\ s}$ may be the adjusted item (e.g., a hysteresis value), $Q_{meas,\ n}$ may be the measured metric value used in the cell reselection procedure, and $Q_{rmd,\ n}$ may be the adjusted item (e.g., offset values depending on the unlicensed intra-frequency or inter-frequency). The comparison between $R_s$ and $R_n$ may be based on the same measured metric. In some of the present implementations, the UE may receive the values of $Q_{rmd,\ s}$ and $Q_{rmd,\ n}$ via the system information (e.g., the SIB2, the SIB3, the SIB4, the SIB5 or others) or via the dedicated signaling (e.g., an RRC (Connection) Release message, RRC Release message with suspend configuration, RRC Release message without suspend configuration) from the serving cell.

In some of the present implementations, the UE may rank the (unlicensed) cells according to the R criteria and calculate the R values (e.g., $R_s$ and $R_n$) using the averaged measured metric results (e.g., the averaged RSRP/RSRQ/SINR values) of the corresponding cells.

In some of the present implementations, the UE may re-rank the cells based on the UE's registered PLMN or equivalent PLMN. The re-ranked cell ranking list may include all cells belonging to the same PLMN. For example, the UE may re-rank the cells by removing the cells not belonging to the registered PLMN or equivalent PLMN from the original cell ranking list. In this case, the original cell ranking list may include cells belonging to different PLMNs.

In some of the present implementations, the UE may base on the signal-strength-related measurement quantity (e.g., RSRP, RSRQ, SINR) to rank the cells. The cells belonging to different PLMNs on the same carrier frequency may be ranked together, which we may refer to "original cell ranking list". If the re-rank rule is applied, the re-ranked cell ranking list may include all cells belonging to the UE's registered PLMN or equivalent PLMN. In some of the present implementations, the UE may perform the cell reselection procedure based on the original cell ranking list. In some of the present implementations, the UE may perform the cell reselection procedure based on the re-ranked cell ranking list. In some of the present implementations, the UE may use the re-ranked cell ranking list to perform an intra-frequency cell reselection procedure and/or an inter-frequency cell reselection procedure. For example, the UE may (re)select the highest-ranked cell among cells listed in the re-ranked cell ranking list on the licensed spectrum(s). For another example, the UE may reselect the highest-ranked cell among cells listed in the re-ranked cell ranking lists on the unlicensed spectrum(s). For example, the UE may (re)select the highest-ranked cell among cells listed in the re-ranked cell ranking list including cells on the licensed spectrum(s) and unlicensed spectrum(s) and belonging to the same PLMN. In some of the present implementations, the cell ranking list on the licensed spectrum(s) may be regarded as a re-rank cell ranking list if the cell ranking list on the licensed spectrum(s) includes cells belonging to the same PLMN.

In some of the present implementations, if the UE has at least two original cell ranking lists wherein each list is corresponding to one unlicensed carrier frequency, the UE may select a cell that satisfies the following two conditions as a suitable cell: (1) the cell belongs to the selected/registered/equivalent PLMN, and (2) the cell is the highest-ranked cell among cells listed in the at least two original cell ranking lists. Furthermore, the selected cell may not be barred.

In some of the present implementations, if the indication (e.g., rangeToBestCell) is not configured, the UE may perform the cell reselection procedure to select a new suitable cell ranked as the best cell. The best cell may be listed in the original cell ranking list or the re-ranked cell ranking list. In some of the present implementations, if the best cell (or the highest-ranked cell) is found to be non-suitable (e.g., not belonging to the UE's registered PLMN or equivalent PLMN, not fulfilling cell selection criterion S), the UE may select the next best cell (or the next highest-ranked cell) as the new suitable cell. The ranking of the next best cell (or the next highest-ranked cell) is lower than that of the best cell (or the highest-ranked cell).

In some of the present implementations, if the UE finds a selected cell to be non-suitable (e.g., not belonging to the UE's registered PLMN or equivalent PLMN), the UE may select the next cell whose ranking is the next lower to the previously selected non-suitable cell. In some of the present implementations, if the best cell is found to be non-suitable (e.g., not belonging to the UE's registered PLMN or equivalent PLMN, not fulfilling cell selection criterion S), the UE may remove the cells belonging to the same PLMN as the best cell in the original cell ranking list.

In some of the present implementations, if the indication (e.g., rangeToBestCell) is configured, the UE may perform a cell reselection procedure to select a new suitable cell. The new suitable cell may have the highest number of beams above a threshold (e.g., an SINR-valued threshold, an RSRP-valued threshold, or an RSRQ-valued threshold) among the cells whose R value is within the indication (e.g., rangeToBestCell) of the R value of the cell ranked as the best cell. For example, if the UE calculates the R value of a cell based on an (averaged) SINR value, the UE may count the number of beams above an SINR-valued threshold of the cell. In some of the present implementations, if there are multiple such cells, the UE may perform the cell reselection procedure to select the highest-ranked cell among them.

In some of the present implementations, if the indication (e.g., rangeToBestCell) is configured, the UE may perform a cell reselection procedure to select a new suitable cell belonging to the UE's registered PLMN (or equivalent PLMN) and having the highest number of beams above a threshold (e.g., an SINR-valued threshold, an RSRP-valued threshold, or an RSRQ-valued threshold) among the cells whose R value is within the indication (e.g., rangeToBestCell) of the R value of the cell ranked as the best cell. In some of the present implementations, the best cell may be listed in a re-ranked cell list. In some of the present implementations, the best cell may or may not belong to the UE's registered PLMN (or equivalent PLMN). For example, if the UE calculates the R value of a cell based on an (averaged) SINR value, the UE may count the number of beams above an SINR-valued threshold of the cell. In some of the present implementations, if there are multiple such cells, the UE may perform the cell reselection procedure to select the highest-ranked cell among them.

In some of the present implementations, the cell may broadcast a channel occupancy ratio value or an RSSI value based on the cell's measurement on the unlicensed carrier frequency. If the cell's broadcast channel occupancy ratio value is above a threshold, the UE may not (re)select such a cell as a suitable cell to camp on. Similarly, if the cell's broadcast RSSI value is below a threshold, the UE may not (re)select such a cell as a suitable cell. In some of the present implementations, if the cell's broadcast channel occupancy ratio value is above a threshold, the UE may perform an inter-frequency cell reselection procedure or an inter-RAT cell reselection procedure to search for a new suitable cell in other frequencies.

In some of the present implementations, if the cell's broadcast RSSI value is below a threshold, the UE may perform an inter-frequency cell reselection procedure or an inter-RAT cell reselection procedure to search for a new suitable cell in other frequencies. If the UE receives the multiple RSSI values from the cell, the UE may compare the average value of the RSSI values with the threshold. In some of the present implementations, the threshold may be broadcast to the UE or sent to the UE via the dedicated signaling.

In some of the present implementations, the threshold may be a pre-defined value (e.g., determined based on UE categories, UE target service types, or other UE characteristics). In some of the present implementations, the UE may adjust the cell's rank based on the cell's broadcast channel occupancy ratio value or RSSI value.

In some of the present implementations, the mentioned dedicated signaling may refer to (but not limited to) RRC message(s). The cell may transmit the dedicated signaling to the UE, wherein the dedicated signaling may be RRC (Connection) Setup message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Resume message, RRC (Connection) Reestablishment message, RRC (Connection) Reject message, RRC (Connection) Release message, RRC Release message including suspend configuration, RRC Release message without suspend configuration inside and UE Capability Enquiry message, etc. The UE may transmit the dedicated signaling to the cell, wherein the dedicated signaling may be RRC (Connection) Setup Request message, RRC (Connection) Setup Complete message, RRC (Connection) Reconfiguration Complete message, RRC (Connection) Resume Request message, RRC (Connection) Resume Complete message, RRC (Connection) Reestablishment Request message, RRC (Connection) Reestablishment Complete message, RRC System Information Request message, UE Assistance Information message, and UE Capability Information message, etc.

The RRC_IDLE/RRC_INACTIVE UE may camp on a cell, which may refer to a "camped cell". The RRC_CONNECTED UE may be served by a serving cell. The serving cell may be a camped cell to the UE when the UE enters in RRC_IDLE/RRC_INACTIVE. The camped cell may be a serving cell to the UE when the UE enters in RRC_CONNECTED. If the UE can measure the radio signal strength from a cell, such cell may be a detected cell to the UE.

Figure 8:
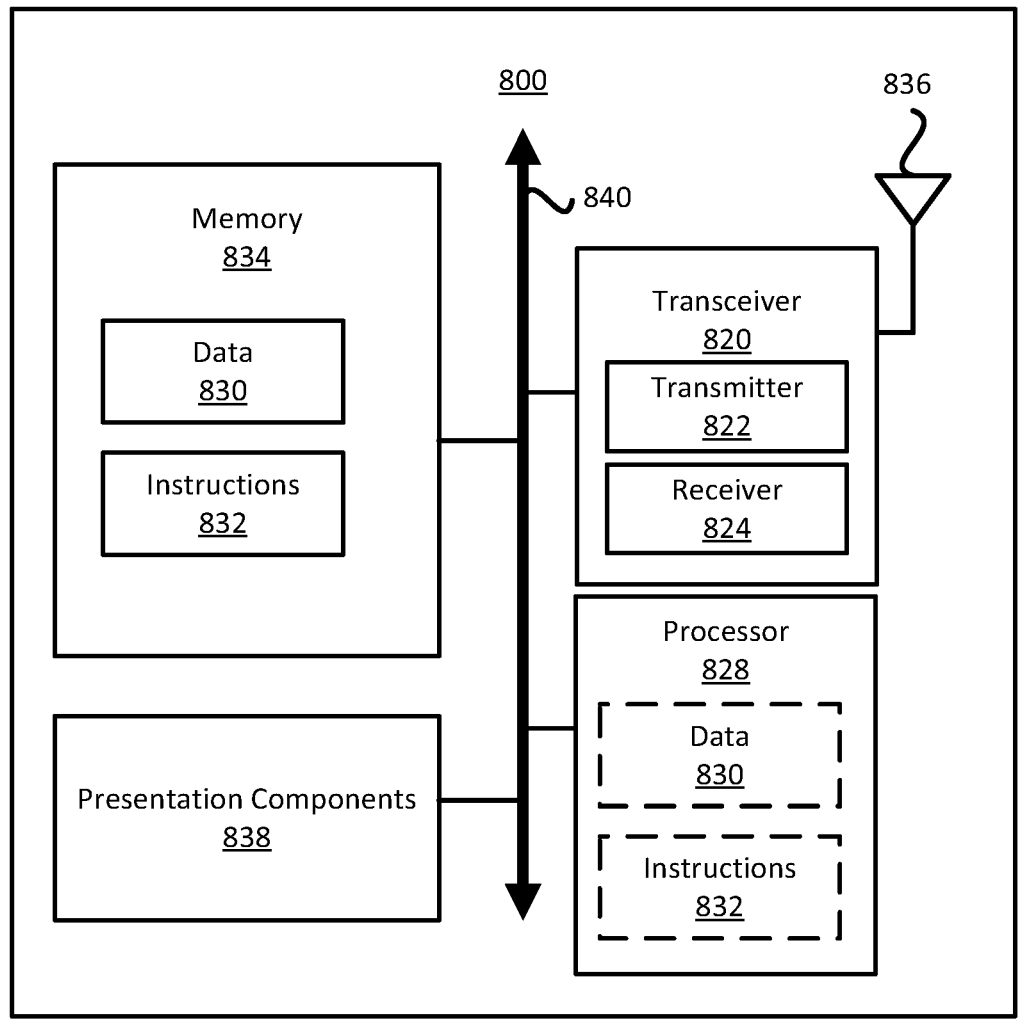
FIG. 8 is a block diagram illustrating a node for wireless communication, in accordance with various aspects of the present disclosure.

FIG. 8 is a block diagram illustrating a node for wireless communication, in accordance with various aspects of the present disclosure. As shown in FIG. 8, a node 800 may include a transceiver 820, a processor 828, a memory 834, one or more presentation components 838, and at least one antenna 836. The node 800 may also include an RF spectrum band module, a BS communications module, a network communications module, and a system communications management module, Input/Output (I/O) ports, I/O components, and power supply (not explicitly shown in FIG. 8). Each of these components may be in communication with each other, directly or indirectly, over one or more buses 840. In one implementation, the node 800 may be a UE, a BS, or any other apparatus of wireless communications that performs various functions described herein, for example, with reference to FIGS. 1 through 7.

The transceiver 820 having a transmitter 822 (e.g., transmitting/transmission circuitry) and a receiver 824 (e.g., receiving/reception circuitry) may be configured to transmit and/or receive time and/or frequency resource partitioning information. In some of the present implementations, the transceiver 820 may be configured to transmit in different types of subframes and slots including, but not limited to, usable, non-usable and flexibly usable subframes and slot formats. The transceiver 820 may be configured to receive data and control channels.

The node 800 may include a variety of computer-readable media. Computer-readable media may be any available media that may be accessed by the node 800 and include both volatile (and non-volatile) media, and removable (and non-removable) media. By way of example, and not limitation, computer-readable media may comprise computer storage media and communication media. Computer storage media may include both volatile (and/or non-volatile), as well as removable (and/or non-removable) media implemented in any method or technology for storage of information such as computer-readable instructions, data structures, program modules or data.

Computer storage media may include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media may typically embody computer-readable instructions, data structures, program modules or other data in a modulated data signal such as a carrier wave or other transport mechanism and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 834 may include computer-storage media in the form of volatile and/or non-volatile memory. The memory 834 may be removable, non-removable, or a combination thereof. Example memory includes solid-state memory, hard drives, optical-disc drives, etc. As illustrated in FIG. 8, the memory 834 may store computer-readable and computer-executable instructions 832 (e.g., software codes) that are configured to, when executed, cause the processor 828 to perform various functions described herein, for example, with reference to FIGS. 1 through 7. Alternatively, the instructions 832 may not be directly executable by the processor 828 but be configured to cause the node 800 (e.g., when compiled and executed) to perform various functions described herein.

The processor 828 (e.g., having processing circuitry) may include an intelligent hardware device, e.g., a Central Processing Unit (CPU), a microcontroller, an ASIC, etc. The processor 828 may include memory. The processor 828 may process the data 830 and the instructions 832 received from the memory 834, and information through the transceiver 820, the baseband communications module, and/or the network communications module. The processor 828 may also process information to be sent to the transceiver 820 for transmission through the antenna 836, to the network communications module for transmission to a core network.

One or more presentation components 838 may present data indications to a person or other device. Examples of presentation components 838 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A User Equipment (UE) for wireless communications, the UE comprising:
   one or more non-transitory computer-readable media storing one or more computer-executable instructions; and
   at least one processor coupled to the one or more non-transitory computer-readable media, and configured to execute the one or more computer-executable instructions to:
   read system information of a plurality of cells on a first carrier frequency to obtain identification information of a plurality of Public Land Mobile Networks (PLMNs);
   report, by an Access Stratum (AS) entity of the UE, the identification information of the plurality of PLMNs to a Non-Access Stratum (NAS) entity of the UE;
   select, by the NAS entity of the UE, one of the plurality of PLMNs as a selected PLMN;
   search for the plurality of cells on the first carrier frequency during a cell selection procedure; and
   select a suitable cell belonging to the selected PLMN from the plurality of cells on the first carrier frequency based on the cell selection procedure.

2. The UE of claim 1, wherein the at least one processor is further configured to execute the one or more computer-executable instructions to:
   perform a cell reselection procedure to select a new suitable cell,
   wherein the new suitable cell is a non-highest-ranked cell among the plurality of cells on the first carrier frequency and belongs to one of the selected PLMN, a registered PLMN, and a PLMN that is indicated as being equivalent to the registered PLMN of the UE.

3. The UE of claim 2, wherein the non-highest-ranked cell and a highest-ranked cell of the plurality of cells on the first carrier frequency belong to two PLMNs of the plurality of PLMNs.

4. The UE of claim 1, wherein the at least one processor is further configured to execute the one or more computer-executable instructions to:
   perform a cell reselection procedure to select a new suitable cell, the cell reselection procedure comprising:
   determining whether the new suitable cell is on a second carrier frequency after determining that a total number of non-suitable cells of the plurality of cells on the first carrier frequency reaches a specific number.

5. The UE of claim 4, wherein the cell reselection procedure further comprises:
   selecting, from one or more cells on the second carrier frequency, a highest-ranked cell as the new suitable cell when the highest-ranked cell belongs to one of the selected PLMN, a registered PLMN, a PLMN that is indicated as being equivalent to the registered PLMN of the UE;
   determining that the highest-ranked cell is a non-suitable cell when the highest-ranked cell does not belong to one of the selected PLMN, the registered PLMN, and the PLMN that is indicated as being equivalent to the registered PLMN of the UE; and
   prohibiting the non-suitable cell from being selected as the new suitable cell for a period of time.

6. The UE of claim 5, wherein the cell reselection procedure further comprises:
   determining the highest-ranked cell by ranking the one or more cells on the second carrier frequency based on a received radio signal quality.

7. The UE of claim 4, wherein the at least one processor is further configured to execute the one or more computer-executable instructions to:
   deprioritize the first carrier frequency for cell reselection for a period of time after determining that the total number of non-suitable cells of the plurality of cells on the first carrier frequency reaches the specific number.

8. The UE of claim 1, wherein the system information includes PLMN-type information indicating at least one PLMN type associated with the plurality of cells.

9. The UE of claim 1, wherein the at least one processor is further configured to execute the one or more computer-executable instructions to:
   provide a message by the NAS entity of the UE to the AS entity of the UE, the message indicating which of one or more PLMN types are supported by the UE,
   wherein the one or more PLMN types include a public PLMN type, a private PLMN type, and a public and private PLMN type.

10. The UE of claim 1, wherein the first carrier frequency is an unlicensed carrier frequency.

11. A method performed by a User Equipment (UE) for wireless communications, the method comprising:
    reading system information of a plurality of cells on a first carrier frequency to obtain identification information of a plurality of Public Land Mobile Networks (PLMNs);
    reporting, by an Access Stratum (AS) entity of the UE, the identification information of the plurality of PLMNs to a Non-Access Stratum (NAS) entity of the UE;
    selecting, by the NAS entity of the UE, one of the plurality of PLMNs as a selected PLMN;
    searching for the plurality of cells on the first carrier frequency during a cell selection procedure; and
    selecting a suitable cell belonging to the selected PLMN from the plurality of cells on the first carrier frequency based on the cell selection procedure.

12. The method of claim 11, further comprising:
    performing a cell reselection procedure to select a new suitable cell,
    wherein the new suitable cell is a non-highest-ranked cell among the plurality of cells on the first carrier frequency and belongs to one of the selected PLMN, a registered PLMN, and a PLMN that is indicated as being equivalent to the registered PLMN of the UE.

13. The method of claim 12, wherein the non-highest-ranked cell and a highest-ranked cell of the plurality of cells on the first carrier frequency belong to two PLMNs of the plurality of PLMNs.

14. The method of claim 11, further comprising:
    performing a cell reselection procedure to select a new suitable cell, the cell reselection procedure comprising:
    determining whether the new suitable cell is on a second carrier frequency after determining that a total number of non-suitable cells of the plurality of cells on the first carrier frequency reaches a specific number.

15. The method of claim 14, wherein the cell reselection procedure further comprises:
    selecting, from one or more cells on the second carrier frequency, a highest-ranked cell as the new suitable cell when the highest-ranked cell belongs to one of the selected PLMN, a registered PLMN, and a PLMN that is indicated as being equivalent to the registered PLMN of the UE;

determining that the highest-ranked cell is a non-suitable cell when the highest-ranked cell does not belong to one of the selected PLMN, the registered PLMN, and the PLMN that is indicated as being equivalent to the registered PLMN of the UE; and prohibiting the non-suitable cell from being selected as the new suitable cell for a period of time.

16. The method of claim 15, wherein the cell reselection procedure further comprises:

determining the highest-ranked cell by ranking the one or more cells on the second carrier frequency based on a received radio signal quality.

17. The method of claim 14, further comprising:

deprioritizing the first carrier frequency for cell reselection for a period of time after determining that the total number of non-suitable cells of the plurality of cells on the first carrier frequency reaches the specific number.

18. The method of claim 11, wherein the system information includes PLMN-type information indicating at least one PLMN type associated with the plurality of cells.

19. The method of claim 11, further comprising:

providing a message by the NAS entity of the UE to the AS entity of the UE, the message indicating which of one or more PLMN types are supported by the UE, wherein the one or more PLMN types include a public PLMN type, a private PLMN type, and a public and private PLMN type.

20. The method of claim 11, wherein the first carrier frequency is an unlicensed carrier frequency.

* * * * *